United States Patent
Garner et al.

(10) Patent No.: US 9,667,706 B2
(45) Date of Patent: May 30, 2017

(54) DISTRIBUTED PROCESSING SYSTEMS

(71) Applicant: Pearson Education, Inc., Upper Saddle River, NJ (US)

(72) Inventors: Holly Garner, Raleigh, NC (US); Miles T. Loring, North Liberty, IA (US); Vishal Kapoor, Iowa City, IA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 274 days.

(21) Appl. No.: 14/462,451

(22) Filed: Aug. 18, 2014

(65) Prior Publication Data

US 2015/0052184 A1 Feb. 19, 2015

Related U.S. Application Data

(60) Provisional application No. 61/866,990, filed on Aug. 16, 2013, provisional application No. 61/867,531, filed on Aug. 19, 2013.

(51) Int. Cl.
*G06F 15/16* (2006.01)
*H04L 29/08* (2006.01)

(52) U.S. Cl.
CPC .................................. *H04L 67/10* (2013.01)

(58) Field of Classification Search
CPC ...... G09B 7/04; G09B 7/08; G06Q 10/06311; G06Q 10/0639; G06Q 50/205
See application file for complete search history.

(56) References Cited

U.S. PATENT DOCUMENTS

| | | | | |
|---|---|---|---|---|
| 7,092,985 B2 * | 8/2006 | Hubbard | ............... | G06F 9/5044 709/201 |
| 8,010,703 B2 * | 8/2011 | Hubbard | ............... | G06F 9/5027 709/201 |
| 2002/0107903 A1 * | 8/2002 | Richter | ............... | H04L 12/2602 709/201 |
| 2006/0271823 A1 * | 11/2006 | Smith | .................... | H04L 43/18 714/37 |
| 2007/0143762 A1 * | 6/2007 | Arnold | ................. | G06F 9/5044 718/103 |
| 2008/0253673 A1 * | 10/2008 | Nakagawa | .......... | G06F 12/0862 382/239 |

* cited by examiner

Primary Examiner — Suraj Joshi
Assistant Examiner — Ayele Woldemariam
(74) Attorney, Agent, or Firm — Kilpatrick Townsend & Stockton LLP

(57) ABSTRACT

A distributed processing system is disclosed herein. The distributed processing system includes a server, a database server, and an application server that are interconnected via a network, and connected via the network to a plurality of independent processing units. The independent processing units can include an analysis engine that is machine learning capable, and thus uniquely completes its processing tasks. The server can provide one or several pieces of data to one or several of the independent processing units, can receive an analysis results from the one or several independent processing units, and can update the result based on a value characterizing the machine learning of the independent processing unit.

19 Claims, 12 Drawing Sheets

DISTRIBUTED PROCESSING SYSTEMS

CROSS-REFERENCES TO RELATED APPLICATIONS

This application claims the benefit of U.S. Provisional Application No. 61/866,990, filed on Aug. 16, 2013, and U.S. Provisional Application No. 61/867,531, filed Aug. 19, 2013, the entirety of both of which are hereby incorporated by reference herein.

BACKGROUND OF THE INVENTION

A distributed system is a software system in which components located on networked computers communicate and coordinate their actions by passing messages. The components interact with each other in order to achieve a common goal.

Use of a distributed system to perform distributed processing provides many benefits in that distributed processing can efficiently combine and utilize processing resources at a variety of locations to quickly solve large and/or complicated problems. In one example of this, a group of networked computers may be controlled by a group of users. However, as normal use of a computer does not always use the computer's entire processing capacity, each of the computers in this group of computers may have some latent, or unused processing capacity. This latent or unused processing capacity can be identified and combined together to solve another problem. Thus, use of the processing capacity of the computers of the group of computers is maximized, which maximization can lead to significant infrastructure savings associated with acquisition of otherwise needed processing capacity.

However, distributed processing still has many shortcomings which limit its usefulness. Thus, new methods, techniques, and systems are required to improve distributed processing.

BRIEF SUMMARY OF THE INVENTION

One aspect of the present disclosure relates to a distributed processing network. This distributed processing network can improve processing speeds. The network can include a source device that can provide groups of data, each of which groups of data can be associated with one or several user authors, and which groups of data together can form a processing task, a plurality of independent processing units that can receive a portion of the processing task, which portion of the processing task can include one or several of the groups of data, and that can characterize one or several aspects of the one or several of the groups of data. In some embodiments, each of the plurality of independent processing units can include a standards module that can receive and store an analysis criterion and an analysis guideline, which analysis criteria identifies one or several attributes for identifying a characterization of the one or several of the groups of data, and which analysis guideline identifies one or several rules for application of the analysis criteria, and an analysis module that can provide a characterization of the one or several of the groups of data according to the analysis criteria and the analysis guideline. The distributed processing system can include a server communicatingly connected to the source device and the plurality of independent processing units via a network. The server can be able to receive a signal encoding the processing task, separate the one or several groups of data from the encoded processing task, generate a signal encoding a first one of the one or several groups of data, send the signal encoding the first one of the one or several groups of data to a first one of the plurality of independent processing units and to a second one of the plurality of independent processing units, receive a first electric signal from the first one of the plurality of independent processing units, which first electric signal can be an encoded first characterization generated by the first one of the plurality of independent processing units of the first one of the one or several groups of data, receive a second electric signal from the second one of the plurality of independent processing units, which second electric signal can be an encoded second characterization generated by the second one of the plurality of independent processing units of the first one of the one or several groups of data, retrieve an accuracy parameter, which accuracy parameter contains a first component associated with the first one of the plurality of independent processing units and a second component associated with the second one of the plurality of independent processing units, which first component can include a norming value that standardizes the first characterization when applied thereto, and which second component can include a norming value that standardizes the second characterization when applied thereto, and calculate a combined characterization of the first one of the one or several groups of data based on a combination of the first and second characterizations and the accuracy parameter.

In some embodiments, the server can further select a group of the plurality of independent processing units for processing of the processing task. In some embodiments, the server can include a stored management guideline that includes one or several rules for the completion of the analysis of the processing task. In some embodiments, the management guideline specifies a number of reviews for one or several of the one or several groups of data in the processing task.

In some embodiments, at least one of the independent processing units is a computer. In some embodiments, the server can increment a count each time that the first one of the one or several groups of data is sent to one of the plurality of independent processing units, and compare the count to a threshold value to determine whether to send the first one of the one or several groups of data to an additional one of the plurality of independent processing units. In some embodiments, the server can select an additional one of the plurality of independent processing units if it is determined to send the first one of the one or several groups of data to an additional one of the plurality of independent processing units. In some embodiments, the server can receive an additional electric signal from the additional one of the plurality of independent processing units, which first electric signal can be an encoded first characterization generated by the additional one of the plurality of independent processing units of the first one of the one or several groups of data.

In some embodiments, the server can update the accuracy parameter with respect to the first one of the plurality of independent processing units. This updating can include comparing the combined characterization of the first one of the one or several groups of data to the first characterization and the accuracy parameter, and incrementing or decrementing the first component of the accuracy parameter based on the comparison. In some embodiments, updating the accuracy parameter further includes retrieving an index function, which index function generates an accuracy parameter update value for the first component of the accuracy parameter according to the difference between the first characterization and the combined characterization. In some embodiments, the first component of the accuracy parameter is incremented or decremented by the accuracy parameter update value.

One aspect of the present disclosure relates to a distributed processing network. The distributed processing network can include features and/or functionalities that improve processing speeds. The network includes a source device that can provide groups of data, each of which groups of data is associated with one or several user authors, and which groups of data together form a processing task. In some embodiments, the distributed processing network can include a plurality of independent processing units that can receive a portion of the processing task, which portion of the processing task can include two or more of the groups of data, and the independent processing units can relatively rank the two or more of the groups of data according to one or several aspects of the two or more of the groups of data, each of which plurality of independent processing units can include a standards module that can receive and store an analysis criterion and an analysis guideline, which analysis criterion identifies one or several attributes for relatively ranking two or more of the groups of data, and which analysis guideline identifies one or several rules for application of the analysis guideline, and an analysis module that can provide a relative ranking of the two or more of the groups of data according to the analysis criteria and the analysis guideline. The independent processing network can include a server communicatingly connected to the source device and the plurality of independent processing units via a network. The server can receive a signal encoding the processing task, separate the two or more groups of data from the encoded processing task, determine a number of relative rankings to complete analysis of the processing task, generate a plurality of pairs to fulfill the number of relative rankings to complete analysis of the processing task, each of the plurality of pairs having at least two of the two or more groups of data, select a set of the plurality of independent processing units, which independent processing units in the set of the plurality of independent processing units are designated to relatively rank at least one pair of the plurality of pairs, and which one pair of the plurality of pairs is relatively ranked by identifying which of the at least two of the two or more groups of data is better based on the one or several attributes of the analysis criteria, generate a plurality of signals encoding the plurality of pairs, send signals encoding the plurality of pairs to the set of independent processing units. In some embodiments, a signal can be sent to each of the set of independent processing units identifying at least one pair of the plurality of pairs. The server can receive signals from the independent processing units in the set of independent processing units, which signals contain the relative rankings of the two of the two or more groups of data forming the pairs of the plurality of pairs, identify a bounding piece that can be one of the groups of the two or more groups of data, and calculate a characterization of the groups of the processing task based on the bounding piece and the ranked sequence.

In some embodiments, the server can generate a ranked sequence of the two or more groups of data. In some embodiments, the bounding piece can be one of the groups of the plurality of the groups of data and an associated characterization. In some embodiments, the server can retrieve the bounding piece from memory. In some embodiments, the server can control the generation of the bounding piece.

In some embodiments, the server can select one or several of the plurality of independent processing units for characterization of a potential bounding piece, which one or several of the plurality of independent processing units are selected based on an accuracy parameter retrieved by the server, which accuracy parameter identifies the degree to which one or several of the plurality of independent processing units have accurately characterized one or several previous data groups. In some embodiments, the server can identify one of the groups of the two or more groups of data as the potential bounding piece, generate a request signal encoding the bounding piece, send the request signal encoding the bounding piece to the selected one or several of the plurality of independent processing units, receive a first signal from the selected one or several of the plurality of independent processing units, which first signal can include an encoded characterization of the potential bounding piece generated by the selected one or several of the plurality of independent processing units, and store an indicator identifying the potential bounding piece as a bounding piece and storing the characterization of the bounding piece.

In some embodiments, the bounding piece can be a plurality of bounding pieces, and in some embodiments, some of the plurality of bounding pieces can have different characterizations. In some embodiments, at least one of the independent processing units can be a computer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
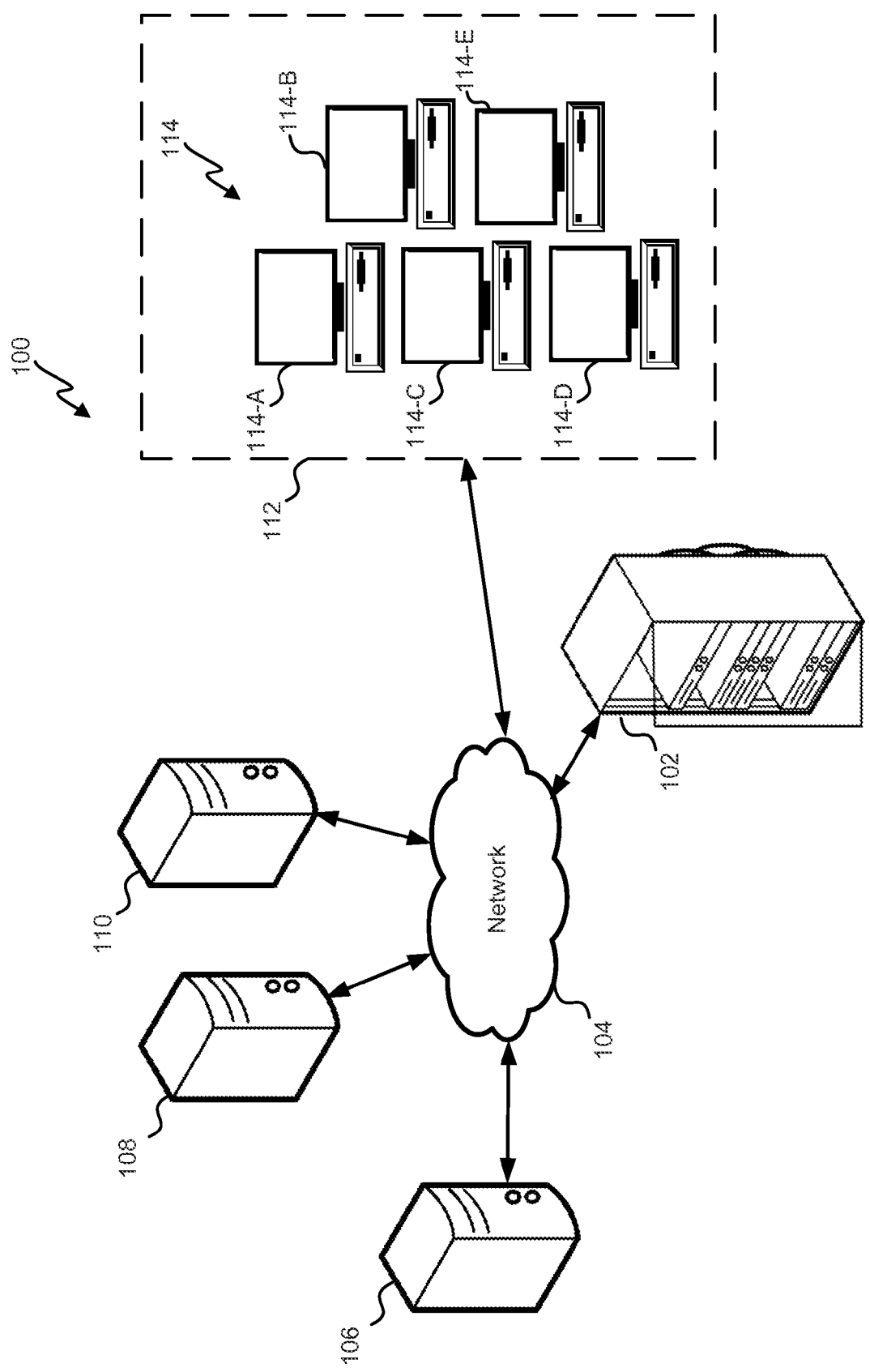
FIG. 1 is a schematic illustration of one embodiment of a distributed processing system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present disclosure relates to systems, methods, and devices for increasing the efficiency and processing speed of distributed computing. Particularly, in some embodiments, distributed computing can be used to evaluate and/or analyze a plurality of unique pieces of data or data groups. In some embodiments, the number of pieces of data or data groups may be large, and the processing times for some or all of the pieces of data and/or data groups can be long. Because of this, significant processing resources can be required for completion of a processing task, which can include a plurality of the pieces of data and/or data groups.

In some embodiments, the processing can be performed by one or several independent processing units which can, in some embodiments, be intelligent in that they are able to learn and adapt based on external stimulus. Particularly, the one or several independent processing units can learn and thereby improve the quality of their output as they evaluate one or several of the pieces of data. While there are many benefits of such a system of intelligent independent processing units, such a system is disadvantaged in that the evaluation of the independent processing unit is unique as it is based on the learning, which in many cases is also unique, of that independent processing unit. Further, in many instances, the uniqueness of the evaluation of the independent processing unit is based on so many variables, many of which are unknown, that it is difficult to identify the source of the uniqueness, and thereby seek to eliminate the uniqueness.

Instead of attempting to identify a source of uniqueness, in some embodiments, the uniqueness of the evaluations can be eliminated and/or mitigated through one or several standardization processes and systems.

In one embodiment, these processes and systems can utilize one or several independent processing units to provide multiple evaluations for the same piece of data and/or data group. These evaluations can be combined, and, in some embodiments, combined according to an accuracy parameter that is associated with one or several independent processing units, to generate a combined evaluation. This accuracy parameter can be based on data relating to the degree of difference between one or more previous evaluations of one or more pieces of data and/or data groups by one or more independent processing units and one or more final evaluations for each of the one or more pieces of data and/or data groups.

In another embodiment, the processes and systems can simplify the processing task to mitigate the adverse effect of uniqueness on the evaluation of one or more pieces of data and/or data groups. In such an embodiment, pieces of data and/or data groups can be associated in, for example, groups of 2 (pairs), groups of 3, groups of 4, groups of 5, groups of 10, and/or any other or intermediate value. These associations of pieces of data and/or groups of data can be provided to one or several independent processing units, which independent processing units can relatively rank the pieces of data and/or groups of data from best to worst. The relative rankings can then be used to assign a final evaluation to one or several of the pieces of data and/or groups of data.

Advantageously, both of the above mentioned embodiments increase the effective processing speed with which the processing task is completed, additionally, as both of these mentioned embodiments decrease the total number of evaluations of each of the pieces of data and/or groups of data used to generate a final evaluation. Additionally, by identifying the accuracy parameter, the distributed processing system is able to direct the pieces of data and/or groups of data to the independent processor best suited for generation of the evaluation.

With reference now to FIG. 1, a schematic illustration of one embodiment of a distributed processing system 100, also referred to herein as a distributed processing network, is shown. The distributed processing system 100 can include a main server 102, also referred to herein as the server. The server 102 can be any desired type of server including, for example, a rack server, a tower server, a miniature server, a blade server, a mini rack server, a mobile server, an ultra-dense server, a super server, or the like. The server 102 can include any desired hardware components including, for example, a motherboard, a processor, memory, one or several hard drives, a network connection, a power supply, and/or the like. In some embodiments, the server can include a user interface that can be configured to provide information to a user and to receive inputs from a user. In one embodiment, the user interface comprises a screen having a plurality of pixels that can be controlled to transform data from electronic format to one or several characters, symbols, text strings, or the like. In some embodiments, the server 102 can provide instructions to and receive information from the other components of the distributed processing system 100. The server 102 can act according to stored instructions, which stored instructions can be located in memory associated with the server 102 and/or in other components of the distributed processing system 100. In some embodiments, the processor in the server 102 can comprise a microprocessor, such as a microprocessor from Intel® or Advanced Micro Devices, Inc.®, or the like.

In some embodiments, and as depicted in FIG. 1, the server 102 can connect to a network 104. The network 104 allows communication between the components of the distributed processing system 100. The network 104 can be, for example, a local area network (LAN), a wide area network (WAN), a wired network, wireless network, a telephone network such as, for example, a cellphone network, the Internet, the World Wide Web, or any other desired network. In some embodiments, the network 104 can use any desired communication and/or network protocols.

As further depicted in FIG. 1, the distributed processing system 100 can include a source device 106. In some embodiments, the source device 106 can be any device that can receive one or several data pieces and/or data groups. In some embodiments, the source device 106 can be a server, a computer, a tablet, a smartphone, a modem, a fax machine, a scanner, or the like. In some embodiments, the source device 106 can be integral to the server 102, and in some embodiments, the source device 106 can be distinct from the server 102.

In one embodiment, the source device 106 can be communicatingly connected to one or several originating devices, which originating devices create the one or several pieces of data and/or groups of data. In some embodiments, the originating devices can be a device that can receive one or several inputs such as, for example, inputs from a sensor, user inputs, or the like. In one embodiment, an originating device can include a computer that is receiving one or several inputs from a user, such as, for example, one or several typed text strings from the user. The originating device can, in some embodiments, transform the received inputs, which can be, for example, one or several text strings into an electric signal.

The distributed processing system 100 can include a database server 108. In some embodiments, the database server 108 can be embodied in hardware or in software and can provide database services to the other components of the distributed processing system 100. The database server 108 can, in some embodiments, be integral to the server 102, and in some embodiments, the database server 108 can be distinct from the server 102. The database server 108 can store the one or several pieces of data and/or groups of data that are received by the source device 106, and can additionally store information relating to other components of the distributed processing system 100, including, for example, the functionality, accuracy, and/or efficiency of other components of the distributed processing system 100. The database server 108 can include one or several databases which will be discussed at greater length below.

In some embodiments, the distributed processing system 100 can include an application server 104. The application server 110 can be embodied in hardware or in software and can facilitate in the control and management of application operations between one or several users and the server 102 and/or the server database 108. The application server 110 can, in some embodiments, be integral to the server 102, and in some embodiments, the application server 110 can be distinct from the server 102.

The distributed processing system 100 can include a plurality of independent processing units 112. The plurality of independent processing units 112 can be one or several independent processing units 114, shown specifically as a first independent processing unit 114-A, a second independent processing unit 114-B, a third independent processing unit 114-C, a fourth independent processing unit 114-D, and a fifth independent processing unit 114-E. In some embodiments, the independent processing units 114 can each be a computing device comprising a processor, which can comprise a microprocessor, such as a microprocessor from Intel® or Advanced Micro Devices, Inc.®, or the like, memory, a user interface configured to provide information to a user and to receive one or several inputs from a user, or the like. In some embodiments, the independent processing units 114 can be computers.

In some embodiments, the independent processing units 114 can be configured to receive one or several data pieces and/or groups of data from the server 102 or other component of the distributed processing system 100 and to evaluate the one or several data pieces and/or groups of data. In some embodiments, this evaluation can include a relative ranking of the one or more pieces of data and/or the groups of data. In some embodiments, this evaluation can include a characterization of the pieces of data and/or groups of data according to one or several criteria and/or guidelines.

As used herein, an "evaluation" refers to the result of an analysis of one or several pieces of data and/or groups of data that include both a characterization and an explanation of the characterization. As used herein, a "relative ranking" refers to the identification of the relative quality of one or several of the one or several pieces of data and/or groups of data as compared to each other. As used herein, a "characterization" refers to an indicator of the result of the evaluation. This indicator can be a numeric value, an alphabetic character, an alphanumeric character, any other symbol, or the like.

As used herein, the "explanation of the characterization" can identify one or several factors leading to the characterization. These factors can be identified in an analysis criterion that identifies one or several analysis parameters, the degree to which they are triggered, and/or the frequency with which they are triggered in the one or several pieces of data and/or groups of data. In some embodiments, these factors can be used to determine a parameter value. In some embodiments, the aggregate of the parameter values of an analysis criterion determines the characterization of the one or several pieces of data and/or groups of data. The analysis parameters can, in some embodiments, describe one or several attributes of the one or several pieces of data and/or data groups. In some embodiments, one or several of these attributes can be computer-detectable. In some embodiments, the degree to which the attributes occur, and/or the frequency with which they occur influences the degree to which, and/or the frequency with which, the analysis parameters are triggered, and thereby influences the parameter value.

In some embodiments, the analysis criteria can be unique and/or specific to each processing task comprising a plurality of pieces of data and/or groups of data, and in some embodiments, the analysis criteria can be non-unique to each processing task. The analysis criteria can be stored in memory of the distributed processing system 100 such as, for example, the server 102 and/or the database server 108. In some embodiments, the analysis criteria can be received from the source device 106; in some embodiments, the analysis criteria can be received from a user device connected with the server 102; and in some embodiments, the analysis criteria can be directly input into the server 102.

In some embodiments, the analysis criteria can be applied according to an analysis guideline. In some embodiments, the analysis guideline identifies one or several rules for application of the analysis criteria. The analysis guideline can increase the uniformity across evaluations. In some embodiments, the analysis guideline can be unique and/or specific to each processing task comprising a plurality of pieces of data and/or groups of data, and in some embodiments, the analysis guideline can be non-unique to each processing task. The analysis guideline can be stored in memory of the distributed processing system 100 such as, for example, the server 102 and/or the database server 108. In some embodiments, the analysis guideline can be received from the source device 106; in some embodiments, the analysis guideline can be received from a user device connected with the server 102; and in some embodiments, the analysis guideline can be directly input into the server 102.

In some embodiments, the distributed processing system 100 can be accessed via one or several devices. These devices, also referred to herein as user devices, can comprise any computing device and can include, for example, a computer, a tablet, a smartphone, or the like. In some embodiments, these devices may be used by any individual including, for example, an employer, an employee, an administrator, a supervisor, an educator, a parent, a student, a trainer, a trainee, or any other individual or group of individuals.

Figure 2:
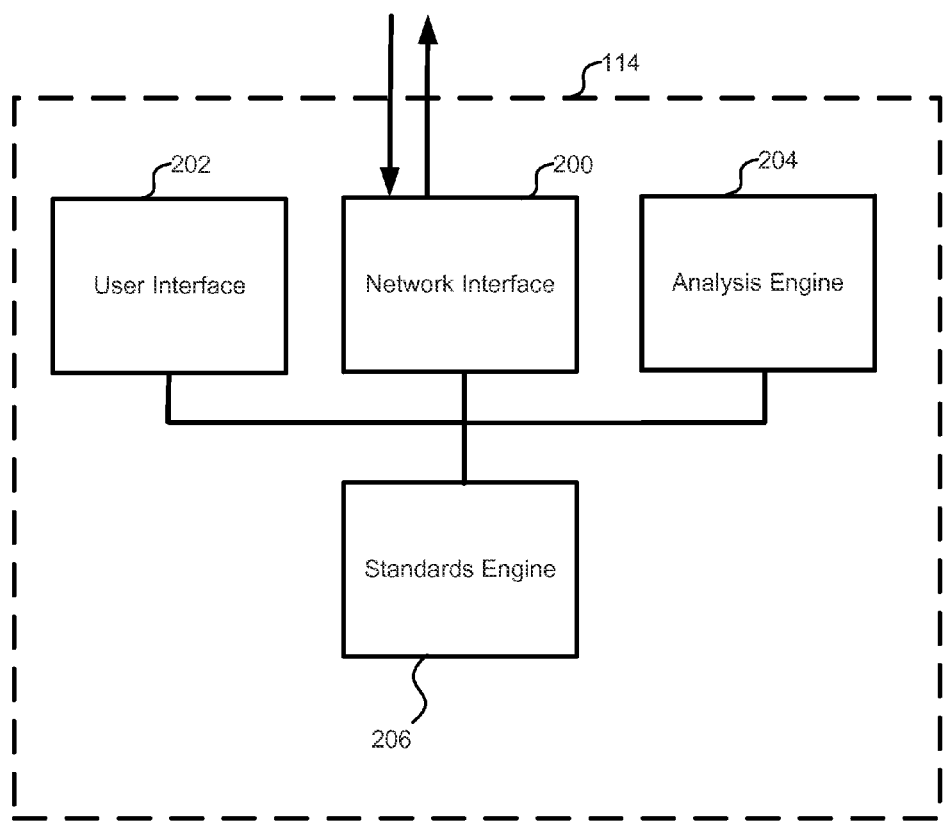
FIG. 2 is a schematic illustration of one embodiment of an independent processing unit of a distributed processing system.

With reference now to FIG. 2, a schematic illustration of one embodiment of the independent processing unit 114 is shown. As discussed above, the independent processing unit 114 can be configured to provide information to and/or receive information from other components of the distributed processing system 100. The independent processing unit 114 can access the distributed processing system 100 through any desired means or technology, including, for example, a webpage, a web portal, or via network 104. As depicted in FIG. 2, the independent processing unit 114 can include a network interface 200. The network interface 200 allows the independent processing unit 114 to access the other components of the distributed processing system 100, and specifically allows the independent processing unit 114 to access the network 104 of the distributed processing system 100. The network interface 200 can include one or several features configured to send and receive information, including, for example, an antenna, a modem, a transmitter, a receiver, or any other feature that can send and receive information. The network interface 200 can communicate via telephone, cable, fiber-optic, or any other wired communication network. In some embodiments, the network interface 200 can communicate via cellular networks, WLAN networks, or any other wireless network.

The independent processing unit 114 can include a user interface 202 that communicates information to, and receives inputs from, a user. The user interface 202 can include a screen having one or several pixels, a speaker, a monitor, a keyboard, a microphone, a mouse, a touchpad, a keypad, or any other feature or features that can receive inputs from a user and provide information to a user. In some embodiments, the pixels of the screen can be controlled to provide information to the user of the independent processing unit 114. In some embodiments, the user interface 202 can allow the user to provide one or several inputs to the independent processing unit 114 that are relevant to the other components of the distributed processing system 100 discussed herein.

The independent processing unit 114 can include an analysis engine 204. In some embodiments, the analysis engine 204 can be configured to receive one or several pieces of data and/or groups of data from the server 102, and/or from the database server 108. In some embodiments, the analysis engine 204 can be an embodiment in hardware or software that can be configured to retrieve the analysis criteria and the analysis guideline. In some embodiments, the analysis engine 204 can be configured to learn and adapt based on external stimulus, and particularly based on the one or several of the pieces of data or data groups previously evaluated by the analysis engine 204. In some embodiments, the analysis engine can be configured to generate a user interface that can facilitate the human review of the one or several pieces of data and/or data groups.

The analysis engine 204 can generate the evaluation according to the analysis criteria and the analysis guideline. In such an embodiment, the analysis module 204 can identify one or several analysis parameters of the analysis criteria, can determine the degree to which the attributes associated with the analysis parameters occur, and/or can determine the frequency with which the attributes occur in the one or several pieces of data and/or groups of data. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like.

The independent processing unit 114 can include a standards engine 206, also referred to herein as a standards module. The standards engine 206 can be embodied in hardware or software. In some embodiments, the standards engine 206 can be configured to receive and store the analysis criteria and the analysis guideline. In some embodiments, the standards engine 206 can receive the analysis criteria and the analysis guideline from another component of the distributed processing system 100 such as, for example, the server 102 and/or the database server 106. The standards engine 206 can be further configured to maintain the operation of the analysis module 204 in accordance with the analysis criteria and the analysis guideline. In some embodiments, the standards engine 206 can be configured to convert all or portions of the analysis criteria and/or analysis guidelines to visual format and to control the user interface 202 to display these. In some embodiments, the standards engine 206 can be configured to convert the analysis criteria and/or analysis guideline from the form in which they were provided to the distributed processing system 100 to one or several lines of computer code that can control the operation of the analysis engine 204.

Figure 3:
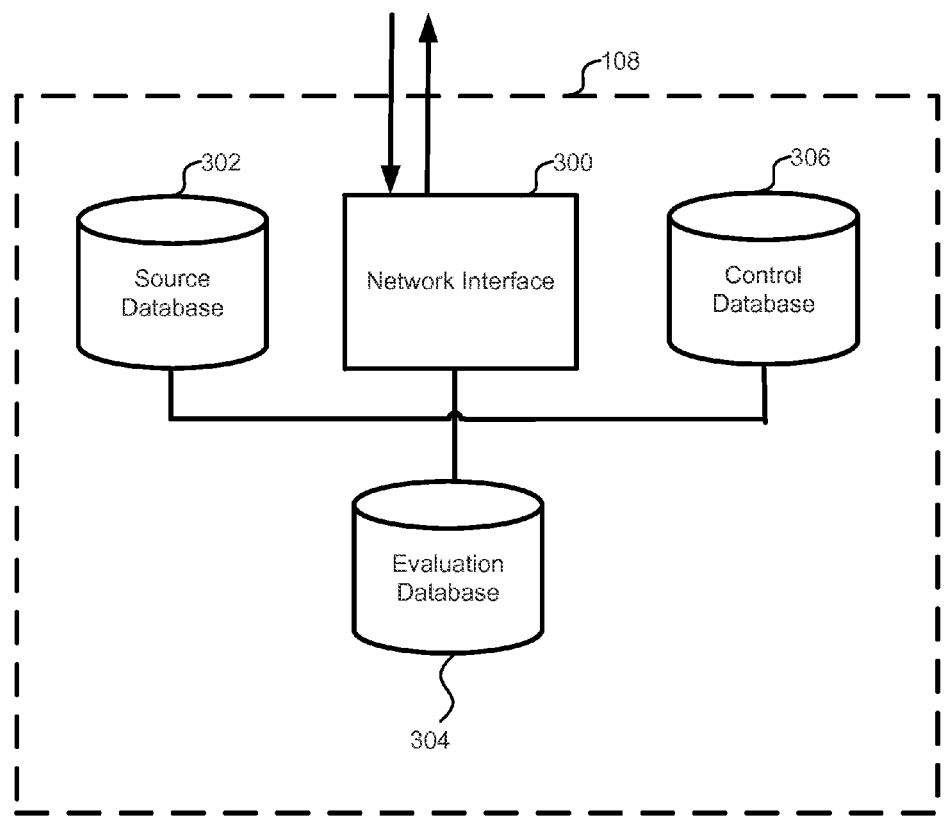
FIG. 3 is a schematic illustration of one embodiment of a database server of a distributed processing system.

With reference now to FIG. 3, a schematic illustration of one embodiment of the database server 108 is shown. The database server 108 can include a network interface 300. The network interface 300 allows the database server 108 to access the other components of the distributed processing system 100, and specifically allows the database server 108 to access the network 104 of the distributed processing system 100. The database server 108 can include features configured to send and receive information, including, for example, an antenna, a modem, a transmitter, receiver, or any other feature that can send and receive information. The network interface 300 can communicate via telephone, cable, fiber-optic, or any other wired communication network. In some embodiments, the network interface 300 can communicate via cellular networks, WLAN networks, or any other wireless network.

The database server 108 can include one or several databases. These databases can store information and/or data relevant to the functions of the distributed processing system 100. In some embodiments, these databases can contain, for example, the one or several pieces of data and/or data groups, the analysis criteria, the analysis guideline, one or several accuracy parameters, previous evaluations, information relating to the originating devices and/or the sources of the one or several pieces of data and/or groups of data, or the like.

In one embodiment, these databases can include, for example, a source database 302. The source database 302 can comprise information relating to the source of some or all of the one or several pieces of data and/or groups of data including, for example, the one or several originating devices. In some embodiments, the source database 302 can include information identifying the originating device and/or the user of the originating device, the author of some or all of the one or several pieces of data and/or data groups, previous pieces of data and/or groups of data originating from the originating device and/or the author, or the like. In some embodiments, the information stored in the source database can be received via the source device 106.

The database server 108 can include an evaluation database 304. The evaluation database 304 can include information used to direct the evaluation of the pieces of data and/or groups of data. In some embodiments, the evaluation database 304 can contain, for example, the analysis criteria and the analysis guideline. This information can be received from the source device 106, and ultimately from one or several originating devices.

The evaluation database 304 can further include information relating to one or several processing tasks. This information can include, for example, the identification of independent processing units 114 that have received one or several pieces of data and/or groups of data for evaluation, the status of the evaluation of one or several pieces of data and/or data groups that have been received by an independent processing unit 114, an accuracy parameter for one or several of the independent processing units 114, an evaluation history for the one or several independent processing units 114, or the like. In some embodiments, the evaluation criteria can comprise data and/or instructions in the form of one or several electronic rubrics or scoring guides for use in the evaluation of the one or several pieces data and/or data groups. The information stored within the evaluation database 304 can be generated within the distributed processing system 100, and in some embodiments, this information can be provided to the distributed processing system 100.

In some embodiments, the evaluation database 304 can include one or several evaluations for one or several pieces of data and/or groups of data. In some embodiments, these evaluations can include a relative ranking, a characterization, and/or an explanation of the characterization and/or relative ranking.

The distributed processing system 100 can include a control database 306. The control database 306 can include information used in the management of the one or several independent processing units 114. In some embodiments, this can, for example, include information used in evaluating the quality of the evaluations of the independent processing units 114, information and/or computer code for generating an accuracy parameter, one or several pieces of learning data and/or learning groups of data that can provide one or several external stimuli to facilitate learning of the analysis engine 204, or the like. In some embodiments, these one or several pieces of learning data and/or learning groups of data can comprise training materials that are associated with a known characterization and, in some embodiments, can exhibit certain traits and/or contain certain predetermined material. This training material can allow the determination of the quality of the evaluations provided by the one or several independent processing units 114, and particularly provided by the analysis modules 204 of the one or several independent processing units 114.

Figure 4:
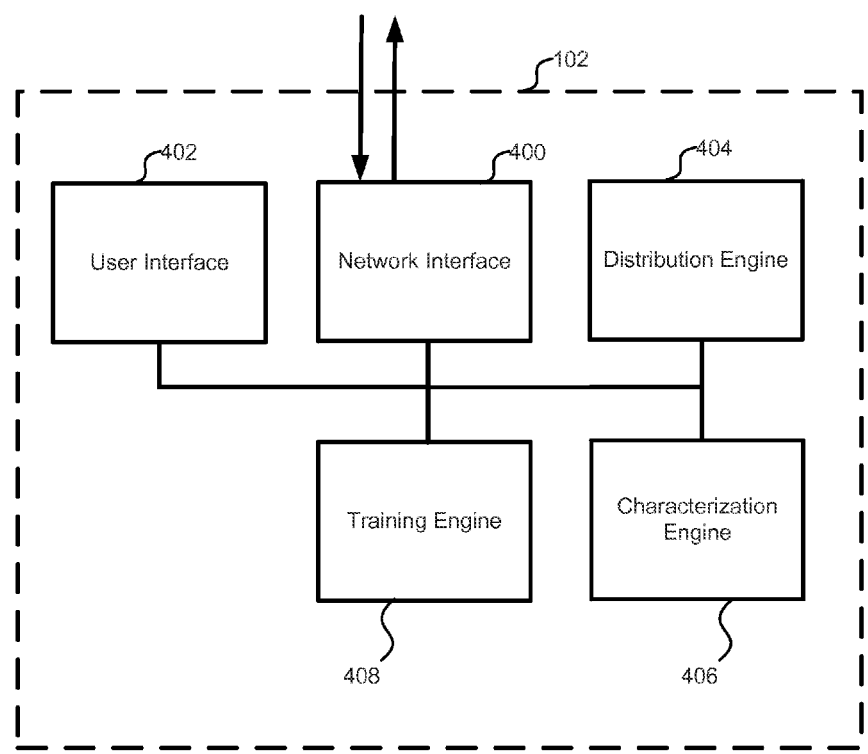
FIG. 4 is a schematic illustration of one embodiment of the server of one embodiment of a distributed processing system.

With reference now to FIG. 4, a schematic illustration of one embodiment of the server 102 is shown. The server 102 includes a network interface 400. The network interface 400 allows the server 102 to access the other components of the distributed processing system 100, and specifically allows the server 102 to access the network 104 of the distributed processing system 100. The server 102 can include features configured to send and receive information, including, for example, an antenna, a modem, a transmitter, a receiver, or any other feature that can send and receive information. The network interface 400 can communicate via telephone, cable, fiber-optic, or any other wired communication network. In some embodiments, the network interface 400 can communicate via cellular networks, WLAN networks, or any other wireless network.

The server 102 can include a user interface 402 that communicates information to, and receives inputs from, a user. The user interface 402 can include a screen having one or several pixels, a speaker, a monitor, a keyboard, a microphone, a mouse, a touchpad, a keypad, or any other feature or features that can receive inputs from a user and provide information to a user. In some embodiments, the pixels of the screen can be controlled to provide information to the user of the server 102. In some embodiments, the user interface 402 can allow the user to provide one or several inputs to the server that are relevant to the other components of the distributed processing system 100 discussed herein.

The server 102 can include a distribution engine 404. The distribution engine 404 can be configured to manage the distribution of the processing task(s) to the one or several independent processing units 114. In one embodiment, the distribution engine can be configured to receive a processing task comprising one or several pieces of data and/or data groups from the source device 106, to identify information relating to the desired completion of the processing task. In some embodiments, this information can be stored within the analysis guideline, and can, for example, specify a number of evaluations for completion of the processing task, a number of repeated evaluations for completion of the processing task, one or several attributes of independent processing units 114 that can be used for completion of the processing task, which can include, for example, a language capability, a subject matter competency level, a training and/or learning level, or the like. In some embodiments, the distribution engine 404 can receive information relating to one or several of the independent processing units 114 and can select a set of the independent processing units 114 for use in completion of the processing task.

The distribution engine 404 can be further configured to monitor the progress of the processing task, and can, for example, identify problems in the completion of the processing task, generate commands and control portions of the distributed processing system 100 to achieve one or several deadlines or to comply with one or several timelines, or the like.

The server 102 can include a characterization engine 406. The characterization engine 406 can be configured to receive one or several evaluations from the independent processing units 114 and to generate a characterization for some or all of the pieces of data and/or groups of data included in the processing task. In some embodiments, the characterization engine 406 can be configured to receive an accuracy parameter for some or all of the independent processing units 114 that has generated an evaluation and to use this accuracy parameter, in connection with the initial characterization contained in the evaluation to generate a final characterization. In some embodiments, this can include, for example, retrieving relative ranking information from the evaluation of the one or several pieces of data and/or data groups, generating a ranking for the pieces of data and/or groups of data in the processing task, and assigning one or several characterizations based on the ranking for the pieces of data and/or groups of data in the processing task. The characterization engine 406 can be further configured to identify a discrepancy between the initial characterization of the independent processing units 114 and the final characterization. This discrepancy can be compared, directly or indirectly, to the accuracy parameter of the independent processing unit 114 that is the source of the initial evaluation, and this discrepancy can be used to update the accuracy parameter of that independent processing unit 114.

The server 102 can include a training engine 408. The training engine 408 can be configured to generate and/or provide material to one or several independent processing units 114 to improve evaluations provided by the independent processing unit 114. In some embodiments, the training material can be configured to be used by the analysis engine 204 for machine learning by the analysis engine 204. In some embodiments, the training material can be transmitted by the analysis engine 204 to a user of the independent processing unit 114. The training engine 408 can be further configured to track training received by one or several of the independent processing units 114 and to generate a training plan based on, for example, the accuracy parameter, past received training, or the like.

Figure 5:
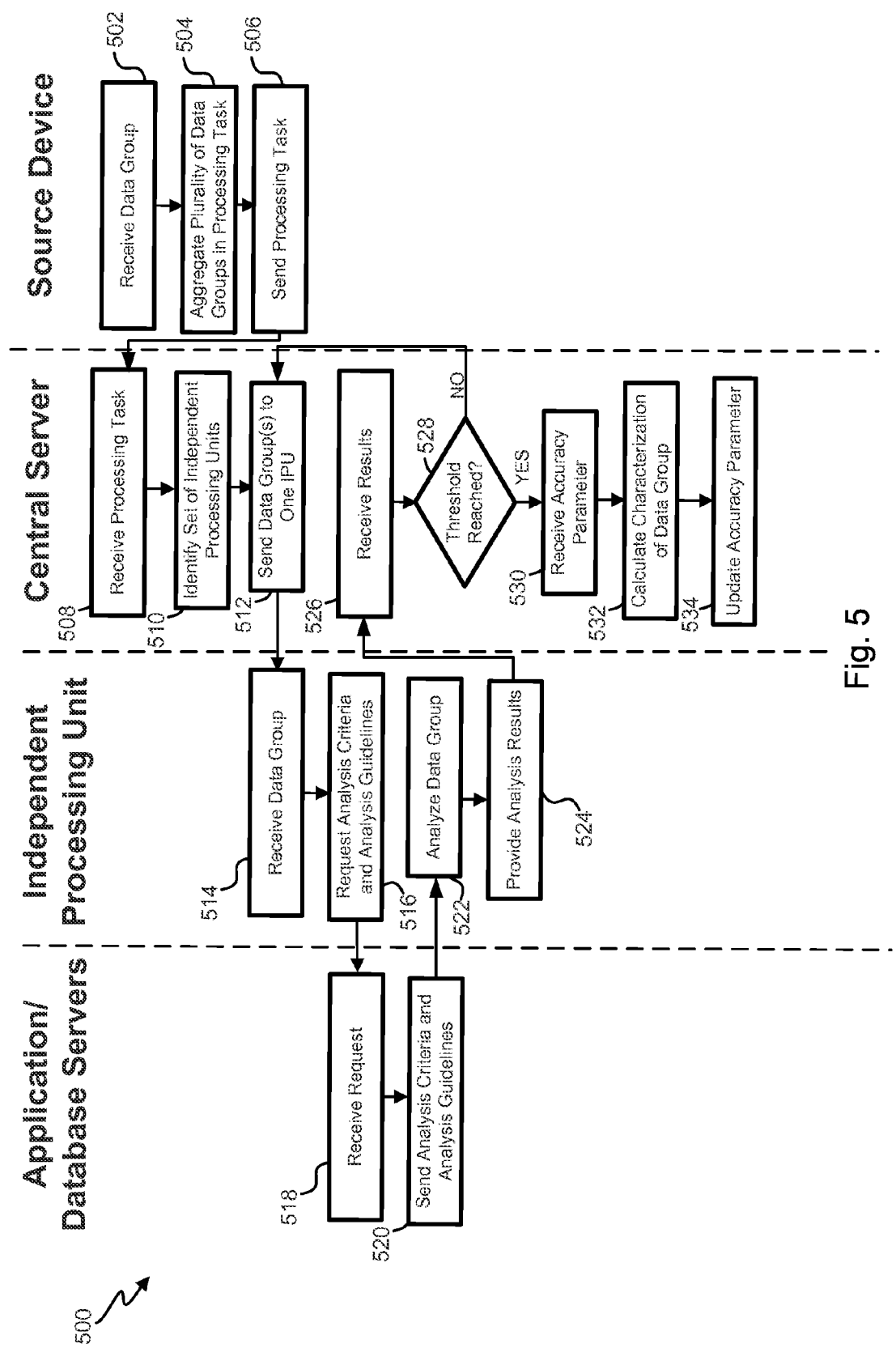
FIG. 5 is a swim-lane diagram illustrating one embodiment of a process for increasing the efficiency and processing speed of distributed computing.

With reference now to FIG. 5, a swim-lane diagram illustrating one embodiment of a process 500 for increasing the efficiency and processing speed of distributed computing is shown. The headers of the swim lanes identify components of the distributed processing system 100 that can perform the indicated step.

The process 500 begins in block 502 wherein the source device 106 receives one or several pieces of data and/or data groups. In some embodiments, these can be received from the one or several originating devices. After the source device 106 receives the one or several pieces of data and/or data groups, the process 500 proceeds to block 504, wherein the one or several pieces of data and/or data groups are aggregated into a processing task. In some embodiments, this aggregation can be performed according to information that is received with one or several of the one or several pieces of data and/or data groups. This information can identify a common aspect of the one or several pieces of data and/or data groups such as, for example, a type of the one or several pieces of data and/or data groups. This information relating to the common aspect of the one or several pieces of data and/or data groups can be used to compile the one or several pieces of data and/or data groups into the processing task. In some embodiments, and as a part of the aggregation of the processing task, the source device 106 can receive and/or retrieve the analysis criteria and analysis guideline relevant to the one or several pieces of data and/or groups of data forming the processing task. In some embodiments, these can be aggregated into the processing task with the one or several pieces of data and/or groups of data. In other embodiments, however, the analysis criteria and analysis guideline are received and/or retrieved at a later point in process 500.

After the processing task has been aggregated, the process 500 proceeds to block 506, wherein the processing task is sent, from the source device 106 to the server 102. In some embodiments, the sending of the processing task includes any method or technique of moving the processing task from the source device 106 to the server 102. In some embodiments, this sending of the processing task can be according to a push-model, and in some embodiments, this sending can be according to a pull-model. After the processing task has been sent, the process 500 proceeds to block 508, wherein the server 102 receives the processing task. In some embodiments, the server 102 can receive the processing task via the network 104 and the network interface 400 of the server 102.

After the processing task has been received by the server 102, the process 500 proceeds to block 510, wherein a set of independent processing units is identified. In some embodiments, this set of independent processing units can be identified by evaluating the information received from the source device 106, including, for example, the analysis criteria and analysis guideline. In some embodiments, this set can be identified based on the size of the processing task, based on any deadlines and/or timelines for completion of the processing task, or the like.

After the set of independent processing units has been identified, the process 500 proceeds to block 512, wherein the processing task is separated into separate pieces of data and/or groups of data, or into groups of pieces of data and/or groups of data. In some embodiments, the server 102 can then generate a signal corresponding to the separate pieces of data and/or groups of data, or groups of pieces of data and/or groups of data, and can, via signal, send the separate pieces of data and/or groups of data, or groups of pieces of data and/or groups of data to one or several of the independent processing units 114 in the set of independent processing units. In some embodiments, this includes any method or technique of moving the data from the server 102 to one or several of the independent processing units 114. In some embodiments, this can include sending data according to a push-model, and in some embodiments, this can include sending data according to a pull-model.

After the data has been sent, the process 500 proceeds, to block 514, wherein the sent data is received by one of the independent processing units 114. This data can be received by the independent processing unit via the network 104 and via the network interface 200. After the data has been received, the process 500 proceeds to block 516, wherein the analysis criteria and/or analysis guideline are requested. In some embodiments in which the source device 106 received the analysis criteria and/or analysis guideline, the intendant processing unit 114 can request these from the source device 106. Alternatively, in some embodiments in which the source device 106 received the analysis criteria and/or analysis guideline, these can be passed to the server 102 as part of the processing task, and the server 102 can distribute these to the individual processing units 114.

In the embodiment depicted in FIG. 5, the analysis criteria and/or analysis guideline are contained in the database server 108, and the independent processing unit 114 can request these from the database server 108. In some embodiments, this can include the generation of an electronic query by the independent processing unit 114, which query is sent to the database server 108, which database server 108 can receive the request as shown in step 518. After the database server 108 receives the request for the analysis criteria and/or analysis guideline, the process 500 proceeds to block 520, wherein the analysis criteria and/or analysis guideline are sent to the independent processing unit 114. In some embodiments, this can include the generation of an electrical signal, which is sent from the database server 108, or the hardware housing the database server 108 to the independent processing unit 114. In some embodiments, step 520 can include the receipt of the analysis criteria and/or analysis guideline by the independent processing unit 114.

After the analysis criteria and/or analysis guideline have been sent to the independent processing unit 114, the process 500 proceeds to block 522, wherein the pieces of data and/or groups of data, or groups of pieces of data and/or groups of data received by the independent processing unit 114 at block 514 are analyzed. In some embodiments, this analysis can be performed by, at, and/or with the independent processing unit, and specifically, by or with the analysis engine 204. In some embodiments, this can include the updating of the analysis engine 204 with the analysis criteria and analysis guideline and the use of the analysis criteria and analysis guideline to analyze the data. This can include, for example, an objective analysis, a subject analysis, a substantive analysis, a contextual analysis, or the like. The details of some embodiments of this analysis will be discussed at greater lengths below.

After the data has been analyzed, the process 500 proceeds to block 524, wherein the analysis result is provided, by the independent processing unit 114 to the server 102. After the analysis result is provided, the process 500 proceeds to block 526, wherein the analysis results are received by the server 102. In some embodiments, the results can be received via one or several electric signals.

After the results have been received, the process 500 proceeds to decision state 528, wherein it is determined if a threshold has been reached. In some embodiments, this threshold can identify the minimum number of evaluations to be performed to complete the processing task. This threshold can, in some embodiments, be specified in the analysis guideline. In some embodiments, the server 102 can track the number of evaluations that have been performed. In one embodiment, this can be done by incrementing a value when data is sent for evaluation and/or when analysis results are received. In some embodiments, this value can then identify the number of evaluations performed for a processing task, but can also include information such as, for example, the number of times some or all of the one or several pieces of data and/or groups of data have been evaluated, which independent processing units 114 evaluated which of the one or several pieces of data and/or groups of data, or the like.

If it is determined that the threshold has not been reached, then the process 500 returns to block 512, and proceeds as outlined above. If it is determined that the threshold has been reached, the process 500 proceeds to block 530, wherein the accuracy parameter is received. In some embodiments, the accuracy parameter can be received from the independent processing unit 114 at the time that the analysis results are received, in some embodiments, the accuracy parameter can be received and/or retrieved from the database server 108, and in some embodiments, the accuracy parameter can be generated by the server 102.

After the accuracy parameter has been received, the process 500 proceeds to block 532, wherein the final characterization of some or all of the one or several pieces of data and/or data groups is calculated and/or generated. In some embodiments, this final characterization can be calculated and/or generated with the accuracy parameter, as well as with the evaluation results from one or several independent processing units 114. In embodiments in which multiple independent processing units 114 generated evaluations for a single piece of data and/or group of data, the calculation of the final characterization can include, for example, adjusting the individual characterizations according to the accuracy value, and combining the adjusted values to generate a final characterization.

After the final characterization has been calculated, the process 500 proceeds to block 534, wherein the accuracy parameter is updated. In some embodiments, this can include comparing the final characterization to some or all of the characterizations of the independent processing units 114, determining a degree of difference between the two, and generating an instance accuracy parameter based on this difference. In some embodiments, the instance accuracy parameter can be used to adjust the accuracy parameter; thus if the deviation of a characterization is greater than indicated by the accuracy parameter, the instance accuracy parameter can be combined with the accuracy parameter to update and/or adjust the accuracy parameter to better reflect this deviation. Conversely, if the deviation of a characterization is less than indicated by the accuracy parameter, the instance accuracy parameter can be combined with accuracy parameter to update and/or adjust the accuracy parameter to better reflect this deviation.

Figure 6:
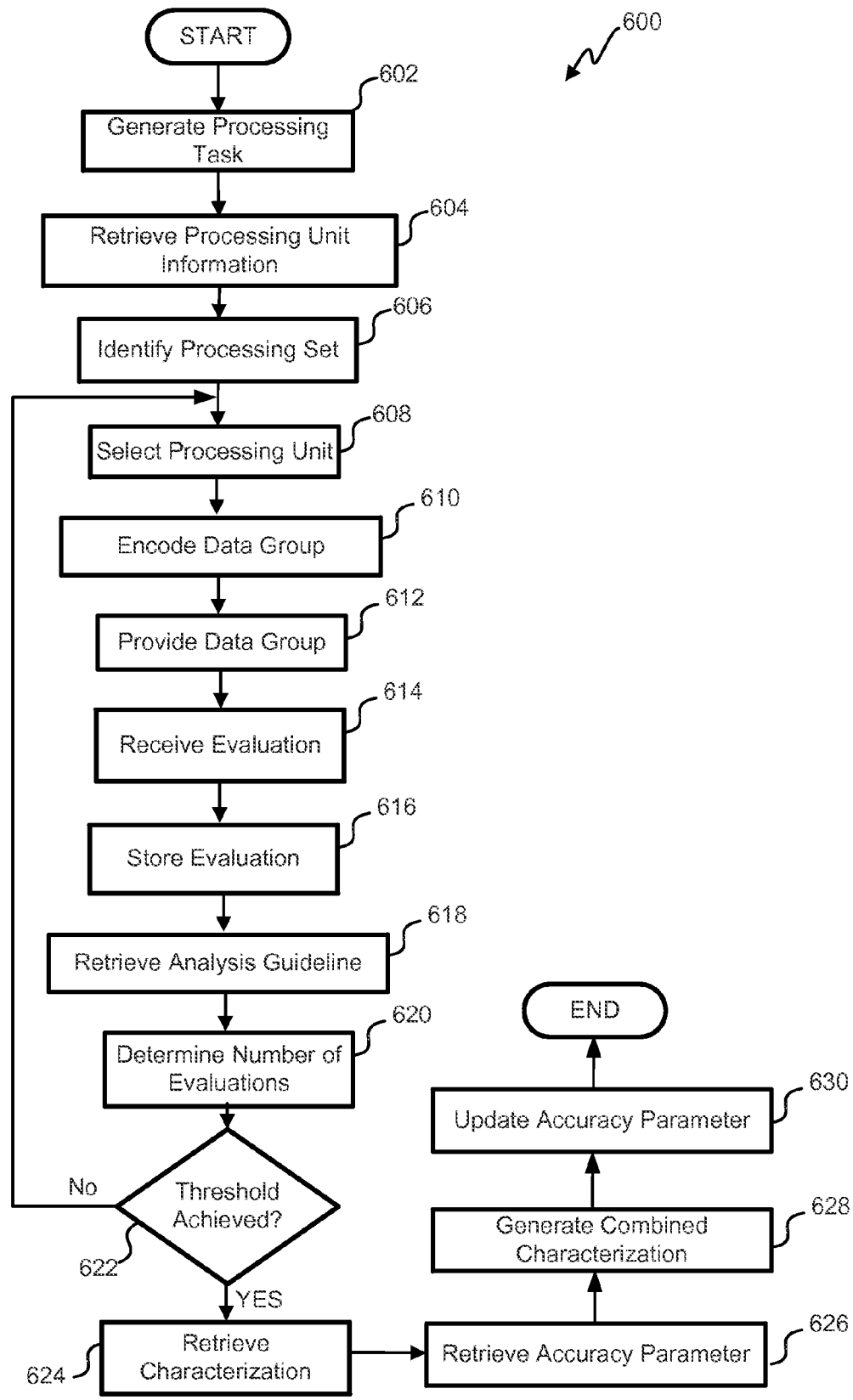
FIG. 6 is a flowchart illustrating one embodiment of a process for calculating an actual score with a distributed processing system.

With reference now to FIG. 6, a flowchart illustrating one embodiment of a process 600 for calculating an actual score is shown, which process increases the efficiency and processing speed of a distributed computing system 100. In some embodiments, the process 600 can be performed by the distributed computing system 100 and/or by a component thereof including, for example, the server 102, the independent processing unit 114, or any other component of the distributed computing system 100.

The process begins at block 602 wherein the processing task is generated and/or aggregated. In some embodiments, the processing task can be aggregated at the source device 106, and in some embodiments, the processing task can be aggregated at the server 102. In some embodiments, the aggregation of the processing task can include the combination of one or several pieces of data and/or groups of data.

After the processing task has been generated, the process 600 proceeds to block 604 wherein independent processing unit information is retrieved and/or received. In some embodiments, this information can identify one or several attributes of one or several independent processing units including, for example, one or several attributes of the analysis engine 204 and/or the user of the analysis engine. These attributes can, for example, identify the number of evaluations provided by one or several of the independent processing units 114 including, for example, evaluations performed by the analysis engine 204, and/or evaluation performed by a user of the analysis engine 204.

After the independent processing unit information is retrieved, the process 600 proceeds to block 606 wherein the processing set is identified. In some embodiments, the processing set can comprise a plurality of independent processing units and/or user of the independent processing units. This set can be selected, in some embodiments, based on the independent processing unit information that is retrieved in block 604, the analysis criteria, and/or analysis guideline. In some embodiments, this set can be selected by the server 102 and/or by another component of the distributed processing system 100.

After the processing set has been identified, the process 600 proceeds to block 608, wherein an independent processing unit 114 is selected. In some embodiments, the selected independent processing unit 114 can be selected from the processing set. The independent processing unit can, in some embodiments, be selected based on the independent processing unit information that is retrieved in block 604, the analysis criteria, and/or analysis guideline.

After the independent processing unit 114 has been selected, the process 600 proceeds to block 610 wherein one or several pieces of data and/or data groups are encoded and/or converted into an electric signal. In some embodiments, this can occur at the server 102 and can be part of, for example, the sending of the one or several pieces of data and/or groups of data to the selected independent processing unit.

After the one or several pieces of data and/or data groups are encoded and/or converted into an electric signal, the process 600 proceeds to block 612 wherein the one or several pieces of data and/or data groups are provided. In some embodiments, this step can be performed for all of the one or several pieces of data and/or data groups of the processing task in that some or all of the one or several pieces of data and/or data groups are sent to an independent processing unit 114. In some embodiments this can result in several independent processing units receiving some of the one or several pieces of data and/or data groups.

In some embodiments, the one or several pieces of data and/or data groups are provided to the independent processing unit via, for example, the user interface 202. After the one or several pieces of data and/or data groups have been provided, the process 600 proceeds to block 614 wherein the evaluation is received. In some embodiments, the evaluation can be received from one or several of the independent processing units 114. In one embodiment, for example in which the processing task was divided into a plurality of pieces of data and/or groups of data, and then one or several of the plurality of pieces of data and/or groups of data was provided to a plurality of independent processing units 114, then the step of block 614 can include receiving the evaluation from some or all of this plurality of independent processing units 114. In some embodiments, the evaluations can be received via, for example, the network 104, and specifically via the user interface 202 of the independent processing units 114 via the network.

After the evaluation has been received, the process 600 proceeds to block 616 wherein the evaluation is stored. In some embodiments, for example, the evaluation can be stored within a portion of the distributed processing system 100 such as, for example, the database server 108. In one embodiment, the evaluations can be stored in one of the databases of the database server 108 such as, for example, the evaluation database 304.

After the evaluation has been stored, the process 600 proceeds to block 618 wherein the evaluation guideline is retrieved. In some embodiments, the evaluation retrieved can be retrieved from the database server 108. The evaluation guideline can include a value indicating the number of evaluations and/or the number of redundant evaluations to be received to complete the processing request. In some embodiments, a redundant evaluation can be an additional evaluation of an already evaluated piece of data and/or group of data.

After the evaluation guideline has been retrieved, the process 600 proceeds to block 620 wherein the number of completed evaluations is determined. In some embodiments, and as mentioned above, the number or completed and/or requested evaluations can be tracked by incrementing a value when data is sent for evaluation and/or when an evaluation is received. In some embodiments, this value can be specific to a processing task, and in some embodiments, this value can include a portion that is specific to a processing task, and a portion specific to some or all of the pieces of data and/or data groups of the processing task. Thus, in one embodiment, the number of times a piece of data and/or a group of data is evaluated can be tracked, as well as the total number of evaluations performed for a processing task. In some embodiments, the determination of the number of completed evaluations can include retrieving the value tracking the number of evaluations.

After the number of completed evaluations is determined, the process 600 proceeds to decision state 622 wherein it is determined if the evaluation threshold is achieved. In some embodiments, this determination can be performed by the server 102, and/or another component of the distributed processing system 100. If it is determined that the evaluation threshold has not been achieved, then the process 600 returns to block 608 and continues as outlined above.

If it is determined that the evaluation threshold has been achieved, then the process 600 proceeds to block 624 wherein characterizations are retrieved. In some embodiments, this can include retrieving the received evaluations, and separating the characterizations from the evaluations. In some embodiments, the evaluations can be retrieved from the database server 108, and the characterizations can be separated from the evaluations by the server 102.

After the characterizations are retrieved, the process 600 proceeds to block 626 wherein the accuracy parameter is retrieved. In some embodiments, for example, the accuracy parameter can be retrieved from the database server 108, and specifically, from one of the databases, such as, for example, the evaluation database 304 and/or the control database 306 of the database server 108.

After the accuracy parameter has been retrieved, the process 600 proceeds to block 628 wherein the final characterization, also referred to herein as a combined characterization is generated. In some embodiments, for example, the combined characterization can be calculated by the server 102 of the distributed processing system 100, and can be calculated based on the retrieved characterizations for one or several of the pieces of data and/or data groups and the accuracy parameters associated with the analysis engine 204, or user thereof, of the independent processing units 114 that provided the evaluation. In some embodiments, some or all of the pieces of data and/or data groups of the processing task can have characterizations, and a final characterization based on the characterizations and the accuracy parameters associated with the analysis engine 204, or user thereof, of the independent processing units 114 that provided the evaluation.

After the actual score has been calculated, the process 600 proceeds to block 630 wherein the accuracy parameter is updated. In some embodiments, for example, the updating accuracy parameter can include the comparison of the characterization and the final characterization, the determination of the degree of deviation between the characterization and the final characterization, a determination of the update and/or augmentation to be provided to the accuracy parameter to reflect the degree of discrepancy between the characterization and the final characterization, and a change of the accuracy parameter based on the update and/or augmentation.

Figure 7:
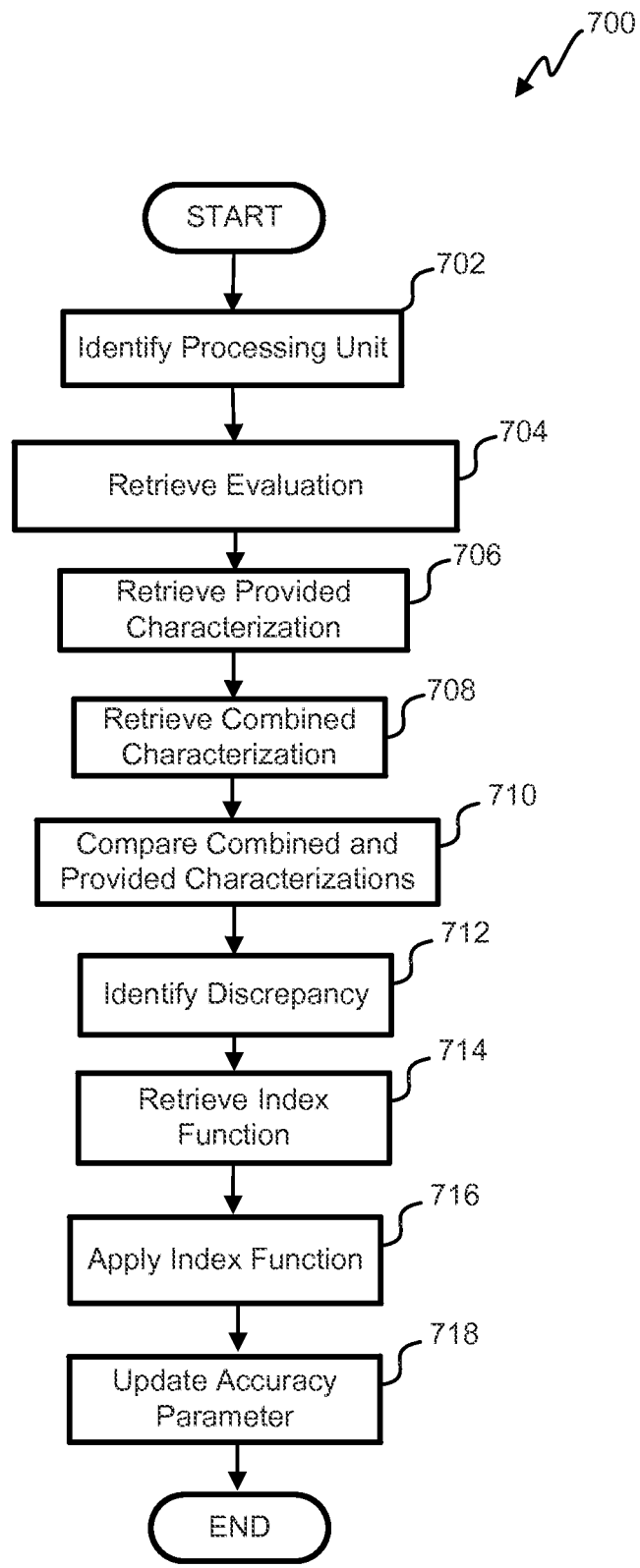
FIG. 7 is a flowchart illustrating one embodiment of a process for calculating an accuracy parameter with a distributed processing system.

With reference now to FIG. 7, a flowchart illustrating one embodiment of a process 700 for calculating an accuracy parameter is shown. In some embodiments, the process 700 can be performed by the distributed processing system 100 and/or a component thereof including, for example, the server 102.

The process 700 begins at block 702 wherein the independent processing unit 114 is identified. In some embodiments, the independent processing unit 114 can be identified as an independent processing unit 114 that completed an evaluation and/or was included in the set of independent processing units. After the independent processing unit 114 has been identified, the process 700 proceeds to block 704 wherein the evaluation is retrieved. In some embodiments, the evaluation can be retrieved by a component of the distributed processing system 100 such as, for example, the server 102, and can be retrieved, for example, from the database server 104.

After the evaluation has been retrieved, the process 700 proceeds to block 706 wherein the characterization is retrieved. The characterization can be retrieved from the evaluation retrieved in block 704, and/or can be separately retrieved by, for example, the server 102 from the database server 108.

After the characterization has been retrieved, the process 700 proceeds to block 708 wherein the final characterization is retrieved. In some embodiments, the final characterization can be retrieved from the database server 108 and/or one of the databases thereof.

After the final characterization has been retrieved, the process 700 proceeds to block 710 wherein the final characterization is compared with characterization. In some embodiments, this comparison can be performed by the server 102. After the characterization and the final characterization have been compared, the process 700 proceeds to block 712 wherein a difference between the characterization and the final characterization is determined. In some embodiments, this can include determining the absolute value and/or magnitude of difference between the characterization and the final characterization; in some embodiments, this can include determining the degree to which the characterization score is higher or lower than the final characterization. In some embodiments, this determination can be made by the server 102.

After the discrepancy between the characterization and the final characterization has been determined, the process 700 proceeds to block 714 wherein an index function is retrieved. In some embodiments, the index function can be used to generate an update value based on the discrepancy and/or differences between the characterization and the final characterization. In some embodiments, for example, the index function can be used to calculate one or several statistical parameters with respect to one or both of the characterization and the final characterization such as, for example, a standard deviation. After the index function has been retrieved, the process 700 proceeds to block 716 wherein the index function is applied. In some embodiments, for example, the index function can be applied to the server 102. In some embodiments, the application of the index function can include the determination of the discrepancy between the characterization and the final characterization in terms of the statistical parameters such as, for example, a standard deviation.

After the index function is applied, the process 700 proceeds to block 718 wherein the accuracy parameter is updated. In some embodiments, for example, the update value, which is the result of the applied index function, can be used to augment and/or update the accuracy parameter that can be, for example, stored within the database server 108.

Figure 8:
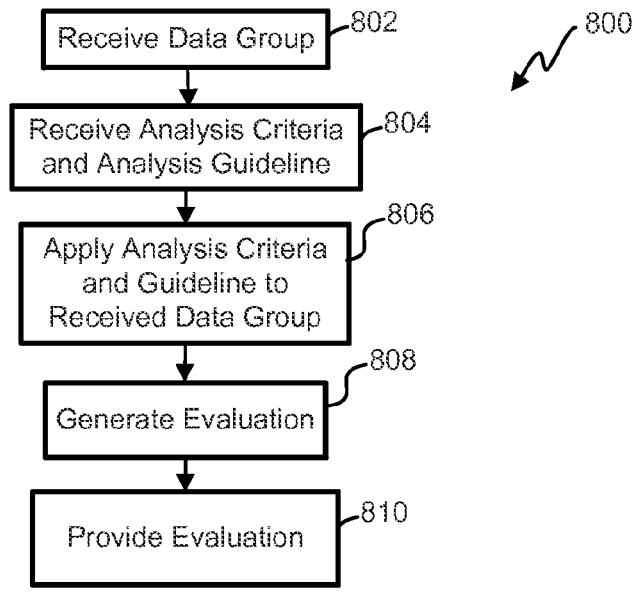
FIG. 8 is a flowchart illustrating one embodiment of a process for analyzing a piece of data and/or a group of data with a distributed processing system.

With reference now to FIG. 8, a flowchart illustrating one embodiment of a process 800 for analyzing a piece of data and/or a group of data is shown. In some embodiments, this process 800 can be performed at one or several of the independent processing units 114, and can be specifically performed by the analysis engine 204 and/or with the analysis engine 204 by a user.

The process 800 begins at block 802 wherein a piece of data and/or group of data is received. In some embodiments, this data can be received from the server via the network 104 and the network interface 200. After the data has been received, the process 800 proceeds to block 804, wherein the analysis criteria and analysis guideline are received. In some embodiments, the analysis criteria and the analysis guideline can be received from the server 102, from the source device 106, and/or from the database server 108. In some embodiments, the analysis criteria and analysis guideline can be received simultaneously with the receipt of the piece of data and/or the group of data, and in some embodiments, the analysis criteria and analysis guideline can be received separate from the piece of data and/or the group of data. In one embodiment, the independent processing unit 114 can generate and send a signal requesting the analysis criteria and/or the analysis guideline, and can receive the analysis criteria and/or analysis guideline in response to this signal.

After the analysis criteria and analysis guideline have been received, the process 800 proceeds to block 806, wherein the analysis criteria and analysis guideline are applied to the received piece of data and/or data group. In some embodiments, this step can include identifying one or several analysis parameters of the analysis criteria, determining the degree to which the attributes associated with the analysis parameters occur, and/or the frequency with which attributes associated with the analysis parameters occurs in the one or several pieces of data and/or groups of data. These attributes can relate to, for example, word usage, vocabulary, spelling, grammar, content, citations, use of citations, or the like. In one embodiment, for example, these criteria can include the number and/or frequency of misspellings, the number and/or frequency of grammar errors, the level of vocabulary of the one or several pieces of data and/or data groups, the correctness and/or level of word usage, the coherency, accuracy, and/or relevancy of the pieces of data and/or data groups, or the like. In some embodiments, this step can further include the application of the analysis guideline to the received piece of data and/or data group. In some embodiments, the application of the analysis criteria can result in the generation of one or several parameter values. In some embodiments, the analysis guideline can influence and/or control how the analysis criteria are applied. This can include, for example, the degree to which a parameter is evaluated and/or the level of scrutiny applied to a parameter.

After the analysis criteria and analysis guideline have been applied to the piece of data and/or data group, the process 800 proceeds to block 808, wherein the evaluation is generated. In some embodiments, the evaluation can include information relating to the one or several parameter values, and how the one or several parameter values were calculated and/or determined, and in some embodiments, the evaluation can include a characterization which can be the result of the combination of the one or several parameter values. In some embodiments, the one or several parameter values can be combined as outlined in the analysis criteria.

After the evaluation has been generated, the process 800 proceeds to block 810, wherein the evaluation is provided. In some embodiments, the evaluation can be provided to the server 102 and/or any other component of the distributed processing system 100. In some embodiments, the providing of the evaluation can include, for example, the generation of a signal comprising the evaluation, and the sending of the signal, via the network 104, to the server 102 or other component of the distributed processing system 100.

Figure 9:
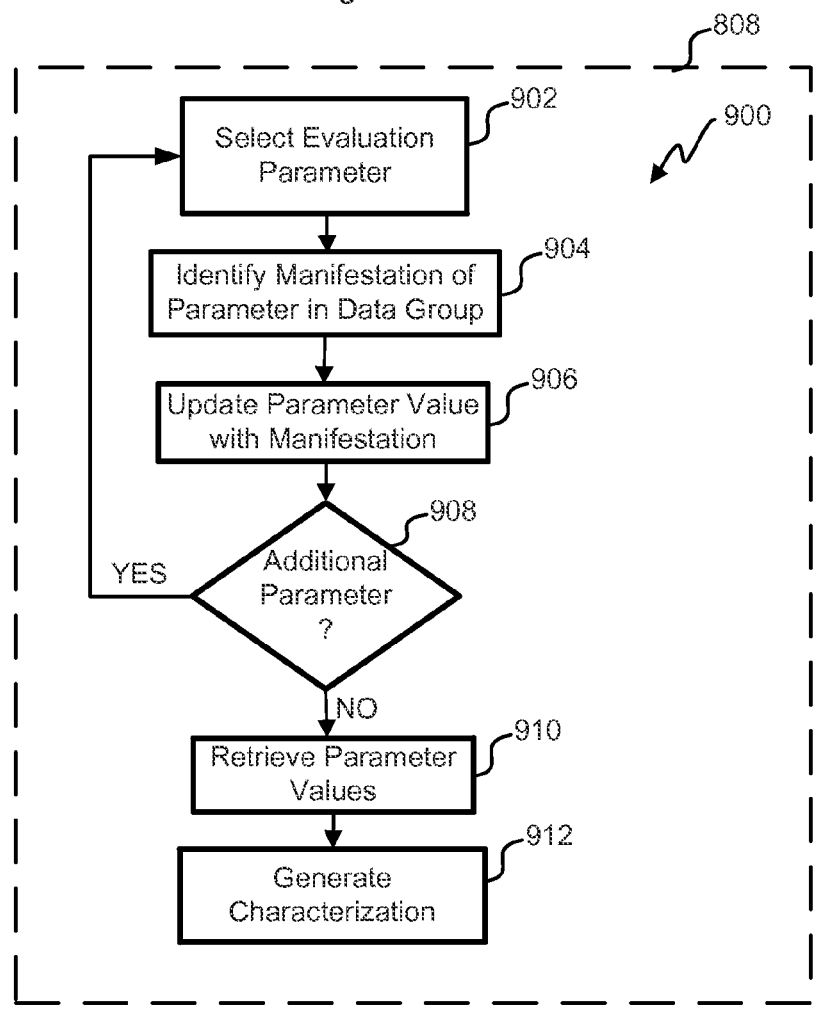
FIG. 9 is a flowchart illustrating one embodiment of a process for generating the evaluation with a distributed processing system.

With reference now to FIG. 9, a flowchart illustrating one embodiment of a process 900 for generating the evaluation is shown. In some embodiments, the process 900 can be performed in the place of, or as a part of, one or both of blocks 806 and 808 of FIG. 8. The process 900 begins at block 902, wherein an analysis parameter is selected. In some embodiments, the analysis parameter can be selected from one of the analysis parameters of the evaluation criteria. In some embodiments, the selected analysis parameter can be a previous unselected analysis parameter.

After the analysis parameter has been selected, the process 900 proceeds to block 904, wherein one or several manifestations of the attribute associated with the parameter are identified in the piece of data and/or data group. In some embodiments, this can be achieved by the review of the piece of data and/or data group by the analysis engine and/or user of the analysis engine. The review can include, for example, a review of spelling, grammar, substance, word usage, vocabulary level, citations, or any other attribute.

After and/or simultaneously with the identification of the one or several manifestations of the attribute associated with the parameter in the piece of data and/or data group, the process 900 proceeds to block 906, wherein a parameter value associated with manifestations and/or the analysis parameter is updated. In some embodiments, this update to the value can reflect the frequency of occurrence and/or the degree of occurrence of the attribute associated with the analysis parameter in the piece of data and/or data group.

After the parameter value has been updated, the process 900 proceeds to decision state 908, wherein it is determined if there is an additional parameter. In some embodiments, this can include, for example, determining whether there are any remaining, unevaluated parameters of the analysis criteria. If it is determined that there are additional, unevaluated parameters, then the process 900 returns to block 902 and proceeds as outlined above. If it is determined that there are not additional, unevaluated parameters, then the process 900 proceeds to block 910, wherein the parameter values are retrieved. In some embodiments, this can include retrieving all of the parameter values for parameters of the analysis criteria.

After the parameter values have been received, the process 900 proceeds to block 912, wherein the characterization is generated. In some embodiments, the characterization can be generated by the combination of the parameter values. These parameter values can be combined by the independent processing unit 114, and/or by the analysis engine 204 or user thereof. In some embodiments, these parameter values can be combined according to the analysis guideline.

Figure 10:
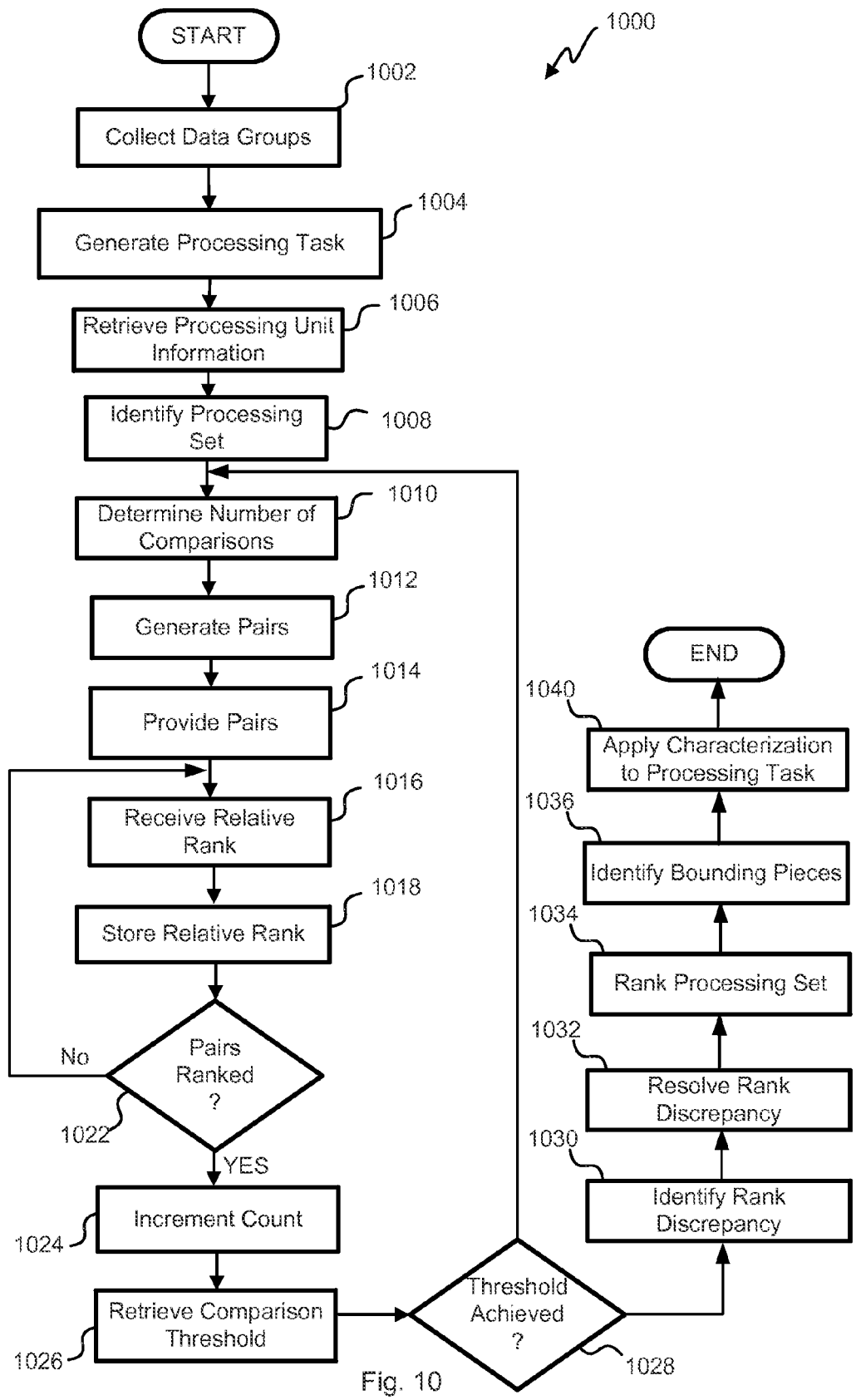
FIG. 10 is a flowchart illustrating one embodiment of a process for parallelized evaluation with a distributed processing system.

With reference now to FIG. 10, a flowchart illustrating one embodiment of a process 1000 for parallelized evaluation is shown, which parallelize evaluation can decrease the amount of time required to process an amount of pieces of data and/or data groups. In some embodiments, the process 1000 can be used to determine the relative ranking of one or several pieces of data and/or data groups within a processing task and/or to thereby assign and/or determine a characterization for the one or several pieces of data and/or data groups. In some embodiments, the process 1000 can provide for the parallel evaluation of a plurality of pieces of data and/or data groups and a relative ranking of those simultaneously evaluated pieces of data and/or data groups. The process 1000 can be performed by the distributed processing system 100 and/or component thereof including, for example, one or several independent processing units 114, and/or the server 102.

The process 1000 begins at block 1002 wherein two or more pieces of data and/or data groups are collected. In some embodiments, the pieces of data and/or data groups can be collected by the source device 106 from, for example, one or several originating devices. Alternatively, in some embodiments, this collection can be performed by the server 102.

After the work product is collected, the process 1000 proceeds to block 1004 wherein the processing task is generated and/or aggregated. In some embodiments, the processing task can be aggregated at the source device 106, and in some embodiments, the processing task can be aggregated at the server 102. In some embodiments, the aggregation of the processing task can include the combination of one or several pieces of data and/or groups of data.

After the processing task has been generated, the process 1000 proceeds to block 1006 wherein independent processing unit information is retrieved and/or received. In some embodiments, this information can identify one or several attributes of one or several independent processing units including, for example, one or several attributes of the analysis engine 204 and/or the user of the analysis engine. These attributes can, for example, identify the number of evaluations provided by one or several of the independent processing units 114 including, for example, evaluations performed by the analysis engine 204, and/or evaluation performed by a user of the analysis engine 204.

After the independent processing unit information is retrieved, the process 1000 proceeds to block 1008 wherein the processing set is identified. In some embodiments, the processing set can comprise a plurality of independent processing units and/or user of the independent processing units. This set can be selected, in some embodiments, based on the independent processing unit information that is retrieved in block 1006, the analysis criteria, and/or analysis guideline. In some embodiments, this set can be selected by the server 102 and/or by another component of the distributed processing system 100.

After the processing set has been identified, the process 1000 proceeds to block 1010, wherein a desired number of comparisons is determined. In some embodiments, the desired number of comparisons can be defined in, for example, the analysis guideline. In some embodiments, this number can vary based on the degree of certainty desired for the characterizations and/or the amount of time, cost, and/or processing resources to be consumed by the processing task.

After the desired number of comparisons is determined, the process 1000 proceeds to block 1012, wherein one or several pairs of pieces of data and/or data groups and/or groups of pieces of data and/or data groups are created. In some embodiments, these groups can be created so that a relative ranking and/or comparison can be performed. Thus, in one embodiment, these groups can include at least two pieces of data and/or data groups so that the one can be compared to the other and/or relatively ranked with respect to the other. In some embodiments, these pairs can be selected at random, and in some embodiments, these pairs can be selected based on some attribute of the pieces of data and/or data groups such as, for example, the originator of the pieces of data and/or data groups, any previous characterizations of pieces of data and/or data groups from the originator, or the like.

After the one or several pairs of pieces of data and/or data groups and/or groups of pieces of data and/or data groups have been generated, the process 1000 proceeds to block 1014, wherein the pairs are provided to, for example, one or several independent processing units 114. In some embodiments, this providing can include the generation and sending of an electric signal containing the one or several pairs of pieces of data and/or data groups and/or groups of pieces of data and/or data groups. This signal can be generated and/or sent by the server 102.

After the pairs have been provided, the process 1000 proceeds to block 1016, wherein the relative rank of one or several pairs of pieces of data and/or data groups and/or groups of pieces of data and/or data groups are received. In some embodiments, these one or several pairs of pieces of data and/or data groups and/or groups of pieces of data and/or data groups can be received by the server 102 from one or several of the independent processing units 114. These relative rankings can identify which of the pieces of data and/or data groups of the one or several pairs and/or groups is (are) relatively better and/or relatively worse. After the relative rank has been received, the process 1000 proceeds to block 1018, wherein the received relative rank information is stored. In some embodiments, this information can be stored in, for example, a component of the distributed processing system 100 such as, for example, the database server 108.

After the relative rank of the provided work product pieces has been received, the process 1000 proceeds to decision state 1022 wherein it is determined if all of the pairs and/or groups in the processing task have been ranked. In some embodiments, this determination can be made by comparison of the number of pairs that were sent to independent processing units 114 and the number of evaluations provided by independent processing units 114. If it is determined that not all pairs/groups have been ranked, then the process can wait a predetermined period and return to block 1016. Alternatively, in some embodiments, if it is determined that an evaluation of one or several pairs/groups is missing, the server 102 can identify the independent processing unit 114 that received the pairs/groups and send a command/reminder to complete the evaluation and/or send the evaluation.

If it is determined that evaluations have been received for all of the pairs/groups, then the process 1000 proceeds to block 1024 wherein the count is incremented. In some embodiments, the number of completed and/or requested evaluations can be tracked by incrementing a value when data is sent for evaluation and/or when an evaluation is received. In some embodiments, this value can be specific to a processing task, and in some embodiments, this value can include a portion that is specific to a processing task, and a portion specific to some or all of the pieces of data and/or data groups of the processing task. Thus, in one embodiment, the number of times a piece of data and/or a group of data is evaluated can be tracked, as well as the total number of evaluations performed for a processing task. In some embodiments, the determination of the number of completed evaluations can include retrieving the value tracking the number of evaluations.

After the count has been incremented, the process 1000 proceeds to block 1026 wherein the threshold is retrieved. In some embodiments, this threshold can identify the minimum number of evaluations to be performed to complete the processing task. This threshold can, in some embodiments, be specified in the analysis guideline and can be received from, for example, the database server 108.

After the threshold has been retrieved, the process 1000 proceeds to decision state 1028 wherein it is determined if the threshold has been achieved. In some embodiment, this can include the comparison of the value tracking the number of evaluations to the threshold. This comparison can be performed by the server 102. In some embodiments, a Boolean-value can be assigned to the processing task indicating whether the threshold has been achieved. Similarly, in any embodiment described herein, Boolean values can be assigned to indicate the outcome of a decision state, with a first Boolean value indicating a true condition corresponding to a "yes" answer in response to the question of the decision state and a second Boolean value indicating a false condition corresponding to a "no" answer in response to the question of the decision state. In some embodiments, the server can then use these Boolean values to identify the outcome of the decision state, and to store the outcome of the decision state in, for example, the database server 108.

If it is determined that the threshold is not achieved, then the process 1000 returns to block 1010 and proceeds as outlined above. If it is determined that the threshold has been achieved, then the process 1000 proceeds to block 1030 wherein the relative rankings of the pieces of data and/or data groups in the pairs/groups are compared to identify ranking discrepancies. In some embodiments, for example, the ranking discrepancies can be differences in the relative rankings provided by the independent processing units 114. In some embodiments, this can include the retrieval of the evaluations and/or rankings from the independent processing units 114 and/or the database server 108 and the comparison of these evaluations by the server 102.

After the ranking discrepancies have been identified, the process 1000 proceeds to block 1032 wherein any identified ranking discrepancies are resolved. In some embodiments, for example, this can include determining a final relative ranking of the pieces of data and/or data groups based on the provided rankings. In some embodiments, this can include the averaging of the ranking, and/or the application of a weighting function to the rankings. This resolution of the rankings of the pieces of data and/or data groups can be performed by the server 102 and/or any other component of the distributed processing system 100.

After the ranking discrepancies have been resolved, the process 1000 proceeds to block 1034 wherein the processing task is ranked. In some embodiments, this can include applying the final rankings, including, for example, any resolved rankings to the processing task, and particularly to the pieces of data and/or data groups forming the processing task. In some embodiments, this can be performed by the server 102 and/or any other component of the distributed processing system 100.

After the processing task is ranked, the process 1000 proceeds to block 1036 wherein one or several bounding data pieces are identified. In some embodiments, bounding data pieces can be pieces of data and/or groups of data located between characterization levels such that all the pieces of data and/or data groups that are relatively higher ranked than the bounding piece have a characterization from a first subset of scores that is higher than the characterization of the bounding piece, and all the pieces of data and/or data groups that are ranked lower than the bounding piece have a characterization from a second subset of scores that is lower than the characterization of the bounding piece.

In some embodiments, the identification of the bounding pieces can include selecting one or several pieces of data and/or data groups of the processing task as potential bounding pieces, characterizing the one or several pieces of data and/or data groups of the processing, and selecting one or several of the potential bounding pieces as bounding pieces. In some embodiments, the one or several potential bounding pieces can be selected based on one or several parameters and/or attributes of the pieces of data and/or data groups of the processing task. In one embodiment, for example, the bounding pieces can be selected based on, for example, the past characterizations of one or several pieces of data and/or data groups from one or several of the originating devices. In some embodiments, the one or several bounding pieces can be selected by performing a brief analysis of the pieces of data and/or data groups in the processing task.

After the potential bounding pieces have been selected, and as mentioned above, a characterization can be given to some or all of the potential bounding pieces. This characterization can proceed according to the process 900 depicted in FIG. 9. After the characterizations of the potential bounding pieces have been received, and as mentioned above, one or several bounding pieces can be selected. In some embodiments, the one or several selected bounding pieces can, as described above, have a characterization that is between levels.

Alternatively to the above steps for identifying one or several bounding pieces, in some embodiments, the bounding pieces can be one or several pre-generated pieces of data and/or data groups that can be, for example, created so as to have a desired characterization. In such an embodiment, the step of block 1036 can comprise retrieving these bounding pieces from, for example, the database server 108.

After the bounding pieces have been identified, the process 1000 proceeds to block 1040 wherein the processing task is characterized. In some embodiments, the characterization of the processing task can be achieved by identifying the relative rank of the one or several bounding pieces within the processing task. In some embodiments, in which the bounding pieces are pre-generated pieces of data and/or data groups, this can include performing the steps of blocks 1010 through 1018 to determine a relative rank of the bounding pieces. After the bounding pieces are relatively ranked, or in some embodiments in which the bounding pieces are identified from the pieces of data and/or groups of data of the processing task, the application of the characterization to the processing task can include identifying pieces of data relatively positioned between two adjacent bounding pieces, and assigning characterization based on these bounding pieces. Thus, when the bounding pieces are selected such that they are between characterization levels, pieces of data and/or data groups that are relatively bounded by two bounding pieces can be assigned the characterization level that is likewise bounded by the two bounding pieces. In other embodiments, the characterization level can be determined based on the separation of characterization levels between the bounding scores, and a determination of the degree of separation between the adjacent bounding scores and an intermediate piece of data and/or data group. This degree of separation can be expressed as a fraction having a denominator of the total number of pieces of data and/or data groups between the bounding pieces, and a numerator of the number of pieces of data and/or data groups separating the intermediate piece of data from one of the bounding pieces. In such an embodiment, the characterization level can be calculated as the characterization level of the bounding piece having a relatively lower characterization level plus the value created by the multiplication of the fractional representation of the degree of separation and the difference in the characterization levels of the bounding pieces. Embodiments can be performed by the server 102 and/or any other component of the distributed processing system 100.

Figure 11:
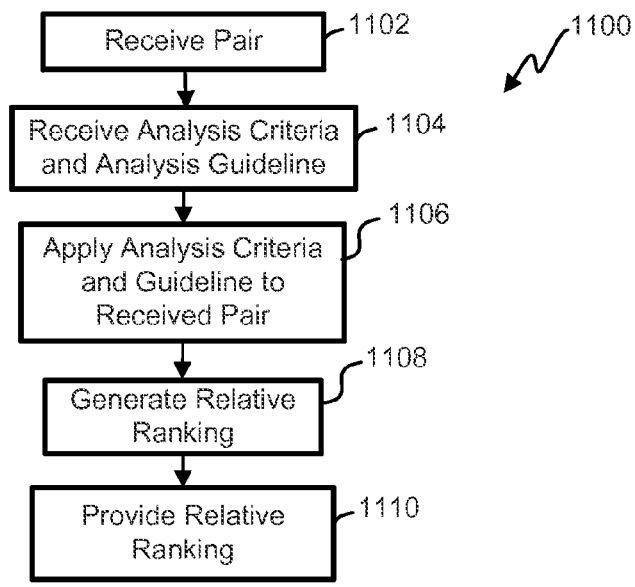
FIG. 11 is a flowchart illustrating one embodiment of a process for analyzing a piece of data and/or a group of data with a distributed processing system.

With reference now to FIG. 11, a flowchart illustrating one embodiment of a process 1100 for analyzing a piece of data and/or a group of data is shown. In some embodiments, this process 1100 can be performed at one or several of the independent processing units 114, and can be specifically performed by the analysis engine 204 and/or with the analysis engine 204 by a user.

The process 1100 begins at block 1102 wherein a pair/group is received. In some embodiments, the pair/group can comprise two or more pieces of data and/or data groups. In some embodiments, this pair/group can be received from the server 102 via the network 104 and the network interface 200. After the pair/group has been received, the process 1100 proceeds to block 1104, wherein the analysis criteria and analysis guideline are received. In some embodiments, the analysis criteria and the analysis guideline can be received from the server 102, from the source device 106, and/or from the database server 108. In some embodiments, the analysis criteria and analysis guideline can be received simultaneous with the receipt of the pair/group, and in some embodiments, the analysis criteria and analysis guideline can be received separate from the pair/group. In one embodiment, the independent processing unit 114 can generate and send a signal requesting the analysis criteria and/or the analysis guideline, and can receive the analysis criteria and/or analysis guideline in response to this signal.

After the analysis criteria and analysis guideline have been received, the process 1100 proceeds to block 1106, wherein the analysis criteria and analysis guideline are applied to the received pair/group. In some embodiments, this step can include identifying one or several analysis parameters of the analysis criteria, determining the relative rank of the pair/group with respect to these one or several analysis parameters, which can be based on, for example, the relative degree to which the attributes associated with the analysis parameters occur, and/or the relative frequency with which attributes associated with the analysis parameters occurs in the one or several pieces of data and/or groups of data in the pair/group. These attributes can relate to, for example, word usage, vocabulary, spelling, grammar, content, citations, use of citations, or the like. In one embodiment, for example, these criteria can include the number and/or frequency of misspellings, the number and/or frequency of grammar errors; the level of vocabulary of the one or several pieces of data and/or data groups; the correctness and/or level of word usage; the coherency, accuracy, and/or relevancy of the pieces of data and/or data groups; or the like. In some embodiments, this step can further include the application of the analysis guideline to the received pair/group. In some embodiments, the application of the analysis criteria can result in the relative ranking of the pieces of data and/or data groups of the pair with respect to one or several analysis parameters.

After the analysis criteria and analysis guideline have been applied to pair/group, the process 1100 proceeds to block 1108, wherein the relative ranking is generated. In some embodiments, the relative rankings with respect to the one or several analysis parameters can be combined to create an overall relative ranking. In some embodiments, the one or several relative rankings with respect to the analysis parameters can be combined as outlined in the analysis criteria.

After the evaluation has been generated, the process 1100 proceeds to block 1110, wherein the relative ranking is provided. In some embodiments, the relative ranking can be provided to the server 102 and/or any other component of the distributed processing system 100. In some embodiments, the providing of the relative ranking can include, for example, the generation of a signal comprising the relative ranking, and the sending of the signal, via the network 104, to the server 102 or other component of the distributed processing system 100.

Figure 12:
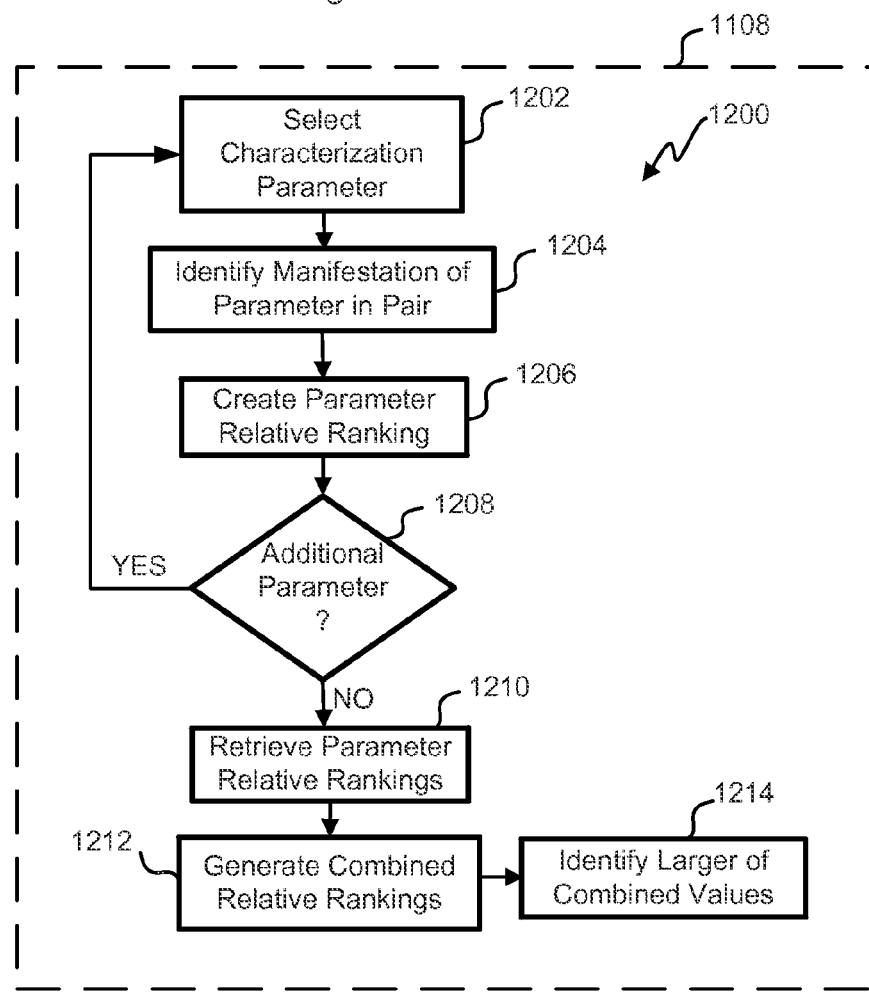
FIG. 12 is a flowchart illustrating one embodiment of a process for generating the relative ranking with a distributed processing system.

With reference now to FIG. 12, a flowchart illustrating one embodiment of a process 1200 for generating the relative ranking is shown. In some embodiments, the process 1200 can be performed in the place of, or as a part of, one or both of blocks 1106 and 1108 of FIG. 11. The process 1200 begins at block 1202, wherein an analysis parameter is selected. In some embodiments, the analysis parameter can be selected from one of the analysis parameters of the evaluation criteria. In some embodiments, the selected analysis parameter can be a previously unselected analysis parameter.

After the analysis parameter has been selected, the process 1200 proceeds to block 1204, wherein one or several manifestations of the attribute associated with the parameter are identified in the pieces of data and/or data groups of the pair/group. In some embodiments, this can be achieved by the review of the pieces of data and/or data groups of the pair/group by the analysis engine 204 and/or user of the analysis engine 204. The review can include, for example, a review of spelling, grammar, substance, word usage, vocabulary level, citations, or any other attribute.

After and/or simultaneously with the identification of the one or several manifestations of the attribute associated with the parameter in the pieces of data and/or data groups of the pair/group, the process 1200 proceeds to block 1206, wherein a parameter relative ranking is created, and particularly wherein a parameter relative ranking value identifying the relative degree to which the attributes associated with the analysis parameters occur, and/or the relative frequency with which attributes associated with the analysis parameters occurs in the one or several pieces of data and/or groups of data of the pair/group is created. In some embodiments, this can include comparing the relative degree to which the attributes associated with the analysis parameters occur, and/or the relative frequency with which attributes associated with the analysis parameters occurs in the one or several pieces of data and/or groups of data of the pair/group, and identifying which of the pieces of data and/or data groups is relatively better with regard to that analysis parameter. In some embodiments, a first value can be associated with a piece of data and/or data group if it is relatively better with respect to an analysis parameter, a second value can be associated with a piece of data and/or data group if it is relatively worse with respect to an analysis parameter, and a third value can be associated with a piece of data and/or data group if it is relatively equal with respect to an analysis parameter.

After the parameter relative ranking has been created, the process 1200 proceeds to decision state 1208, wherein it is determined if there is an additional parameter. In some embodiments, this can include, for example, determining whether there are any remaining, unevaluated parameters of the analysis criteria. If it is determined that there are additional, unevaluated parameters, then the process 1200 returns to block 1202 and proceeds as outlined above. If it is determined that there are not additional, unevaluated analysis parameters, then the process 1200 proceeds to block 1210, wherein the parameter relative ranking values are retrieved. In some embodiments, this can include retrieving all of the parameter relative ranking values for parameters of the analysis criteria.

After the parameter relative ranking values have been received, the process 1200 proceeds to block 1212, wherein the relative ranking of the pair/group is generated. In some embodiments, the relative ranking can be generated by the combination of the parameter relative rankings. In some embodiments, these parameter relative ranking values can be combined according to the analysis guideline. In some embodiments, for example, some or all of the analysis parameters can be associated with a weighting value. In such an embodiment, the combined relative ranking can be calculated by a combination of the weighting values and the parameter relative ranking values. In one embodiment, for example, some or all of the parameter ranking values can be multiplied by their weighting value, and the products of those multiplications can be added to create a combined value. In one such embodiment, the combined values of the pieces of data and/or data groups of the pair/group can be compared to determine the relative ranking of the pair/group, as indicated in block 1214 of FIG. 12. Thus, in one embodiment, a piece of data and/or data group can be relatively better if its combined value is larger than the combined value of another piece of data and/or data group. These parameter relative rankings can be generated by the independent processing unit 114, and/or by the analysis engine 204 or user thereof.

Figure 13:
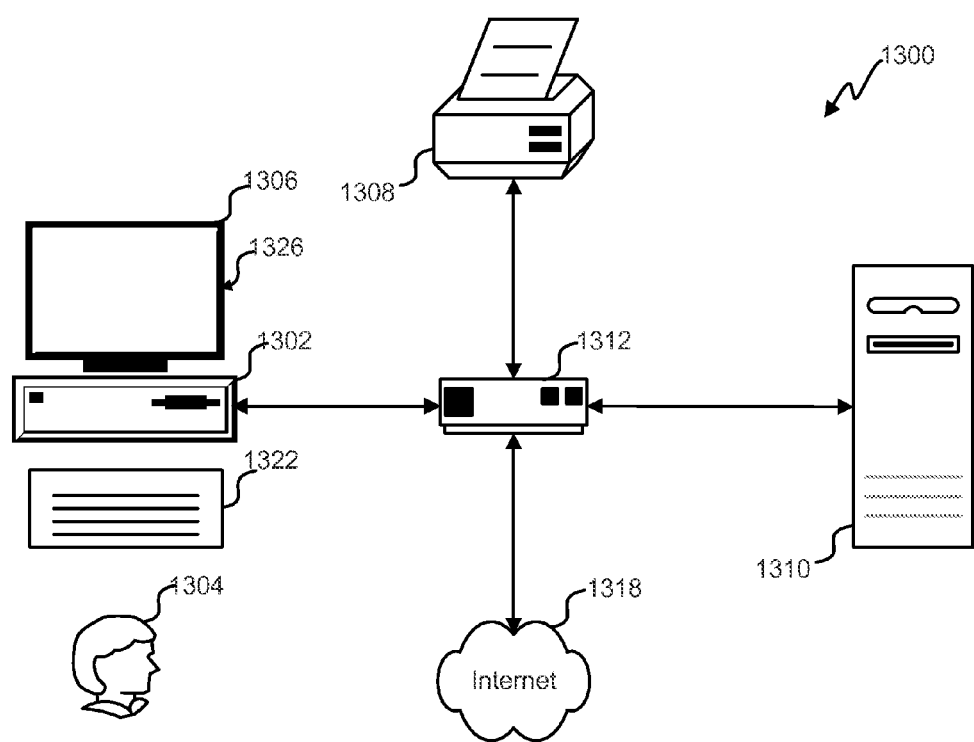
FIG. 13 is a block diagram of an embodiment of a computer system.

With reference now to FIG. 13, an exemplary environment with which embodiments may be implemented is shown with a computer system 1300 that can be used by a user 1304 as all or a component of a crowd-scoring system 100. The computer system 1300 can include a computer 1302, keyboard 1322, a network router 1312, a printer 1308, and a monitor 1306. The monitor 1306, processor 1302 and keyboard 1322 are part of a computer system 1326, which can be a laptop computer, desktop computer, handheld computer, mainframe computer, etc. The monitor 1306 can be a CRT, flat screen, etc.

A user 1304 can input commands into the computer 1302 using various input devices, such as a mouse, keyboard 1322, track ball, touch screen, etc. If the computer system 1300 comprises a mainframe, a designer 1304 can access the computer 1302 using, for example, a terminal or terminal interface. Additionally, the computer system 1326 may be connected to a printer 1308 and a server 1310 using a network router 1312, which may connect to the Internet 1318 or a WAN.

The server 1310 may, for example, be used to store additional software programs and data. In one embodiment, software implementing the systems and methods described herein can be stored on a storage medium in the server 1310. Thus, the software can be run from the storage medium in the server 1310. In another embodiment, software implementing the systems and methods described herein can be stored on a storage medium in the computer 1302. Thus, the software can be run from the storage medium in the computer system 1326. Therefore, in this embodiment, the software can be used whether or not computer 1302 is connected to network router 1312. Printer 1308 may be connected directly to computer 1302, in which case, the computer system 1326 can print whether or not it is connected to network router 1312.

Figure 14:
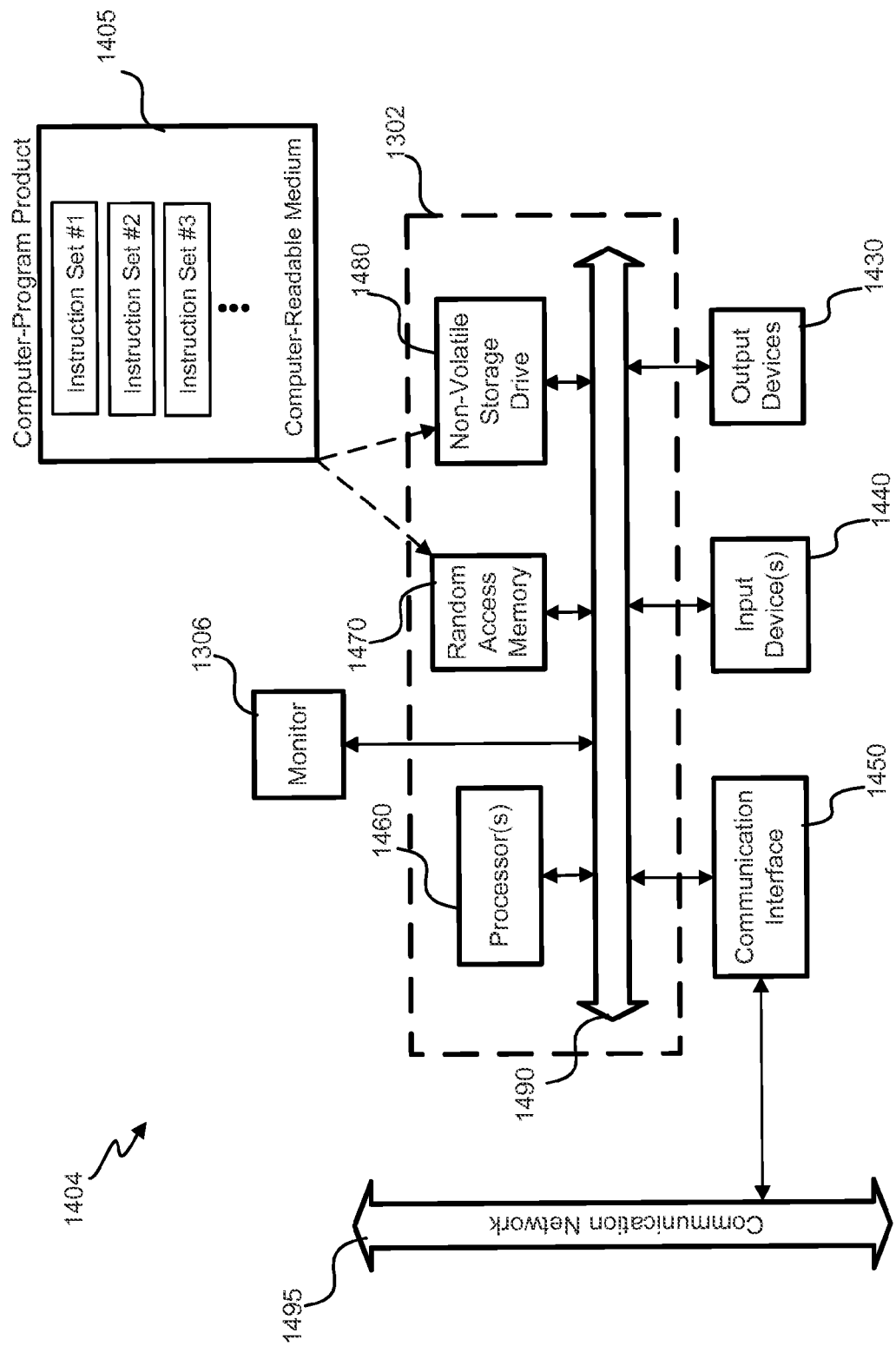
FIG. 14 is a block diagram of an embodiment of a special-purpose computer system.

With reference to FIG. 14, an embodiment of a special-purpose computer system 1404 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1326, it is transformed into the special-purpose computer system 1404.

Special-purpose computer system 1404 comprises a computer 1302, a monitor 1306 coupled to computer 1302, one or more additional user output devices 1430 (optional) coupled to computer 1302, one or more user input devices 1440 (e.g., keyboard, mouse, track ball, touch screen) coupled to computer 1302, an optional communications interface 1450 coupled to computer 1302, a computer-program product 1405 stored in a tangible computer-readable memory in computer 1302. Computer-program product 1405 directs system 1404 to perform the above-described methods. Computer 1302 may include one or more processors 1460 that communicate with a number of peripheral devices via a bus subsystem 1490. These peripheral devices may include user output device(s) 1430, user input device(s) 1440, communications interface 1450, and a storage subsystem, such as random access memory (RAM) 1470 and non-volatile storage drive 1480 (e.g., disk drive, optical drive, solid state drive), which are forms of tangible computer-readable memory.

Computer-program product 1405 may be stored in non-volatile storage drive 1480 or another computer-readable medium accessible to computer 1302 and loaded into memory 1470. Each processor 1460 may comprise a microprocessor, such as a microprocessor from Intel® or Advanced Micro Devices, Inc.®, or the like. To support computer-program product 1405, the computer 1302 runs an operating system that handles the communications of product 1405 with the above-noted components, as well as the communications between the above-noted components in support of the computer-program product 1405. Exemplary operating systems include Windows® or the like from Microsoft® Corporation, Solaris® from Oracle®, LINUX, UNIX, and the like.

User input devices 1440 include all possible types of devices and mechanisms to input information to computer system 1302. These may include a keyboard, a keypad, a mouse, a scanner, a digital drawing pad, a touch screen incorporated into the display, audio input devices such as voice recognition systems, microphones, and other types of input devices. In various embodiments, user input devices 1440 are typically embodied as a computer mouse, a trackball, a track pad, a joystick, wireless remote, a drawing tablet, a voice command system. User input devices 1440 typically allow a user to select objects, icons, text and the like that appear on the monitor 1306 via a command such as a click of a button or the like. User output devices 1430 include all possible types of devices and mechanisms to output information from computer 1302. These may include a display (e.g., monitor 1306), printers, non-visual displays such as audio output devices, etc.

Communications interface 1450 provides an interface to other communication networks 1495 and devices and may serve as an interface to receive data from and transmit data to other systems, WANs and/or the Internet 1318. Embodiments of communications interface 1450 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1450 may be coupled to a computer network, to a FireWire® bus, or the like. In other embodiments, communications interface 1450 may be physically integrated on the motherboard of computer 1302, and/or may be a software program, or the like.

RAM 1470 and non-volatile storage drive 1480 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1470 and non-volatile storage drive 1480 may be configured to store the basic programming and data constructs that provide the functionality of various embodiments of the present invention, as described above.

Software instruction sets that provide the functionality of the present invention may be stored in RAM 1470 and non-volatile storage drive 1480. These instruction sets or code may be executed by the processor(s) 1460. RAM 1470 and non-volatile storage drive 1480 may also provide a repository to store data and data structures used in accordance with the present invention. RAM 1470 and non-volatile storage drive 1480 may include a number of memories including a main random access memory (RAM) to store of instructions and data during program execution and a read-only memory (ROM) in which fixed instructions are stored. RAM 1470 and non-volatile storage drive 1480 may include a file storage subsystem providing persistent (non-volatile) storage of program and/or data files. RAM 1470 and non-volatile storage drive 1480 may also include removable storage systems, such as removable flash memory.

Bus subsystem 1490 provides a mechanism to allow the various components and subsystems of computer 1302 communicate with each other as intended. Although bus subsystem 1490 is shown schematically as a single bus, alternative embodiments of the bus subsystem may utilize multiple busses or communication paths within the computer 1302.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A distributed processing network system configured to improve processing speeds for evaluating student work product, the network system comprising:
    a processor;
    a memory;
    a source device comprising an educational service provider configured to provide groups of data comprising an assignment, wherein each of the groups of data is associated with one or several user authors, wherein the groups of data together comprise a processing task;
    a plurality of machine learning independent processing units configured to receive a portion of the processing task, wherein the portion of the processing task comprises one or several of the groups of data, and characterize one or several aspects of the one or several of the groups of data, wherein each of the plurality of independent processing units comprises:
        a standards module configured to receive and store an analysis criterion and an analysis guideline, wherein the analysis criteria identifies one or several attributes for identifying a score of the one or several of the groups of data, and wherein the analysis guideline identifies one or several rules for application of the analysis criteria; and
        an analysis module configured to provide a score of the one or several of the groups of data according to previous machine learning and the analysis criteria and the analysis guideline; and
    a server communicatingly connected to the source device and the plurality of independent processing units via a network, wherein the server is configured to:
    receive a signal encoding the processing task;
        separate the one or several groups of data from the encoded processing task;
        generate a signal encoding a first one of the one or several groups of data; send the signal encoding the first one of the one or several groups of data to a first one of the plurality of independent processing units and to a second one of the plurality of independent processing units;
        receive a first electric signal from the first one of the plurality of independent processing units, wherein the first electric signal comprises an encoded first score generated by the first one of the plurality of independent processing units of the first one of the one or several groups of data;
        receive a second electric signal from the second one of the plurality of independent processing units, wherein the second electric signal comprises an encoded second score generated by the second one of the plurality of independent processing units of the first one of the one or several groups of data;
        retrieve an accuracy parameter, wherein the accuracy parameter contains a first component associated with the first one of the plurality of independent processing units and a second component associated with the second one of the plurality of independent processing units, wherein the first component comprises a norming value that standardizes the first score when applied thereto, and wherein the second component comprises a norming value that standardizes the second score when applied thereto;
        calculate a combined score of the first one of the one or several groups of data based on a combination of the first and second scores and the accuracy parameter;
        update the accuracy parameter, wherein updating the accuracy parameter comprises updating the first component of the accuracy parameter; and
        provide training material to the first one of the plurality of independent processing units based on the updated accuracy parameter, wherein the training material facilitates machine learning in the first one of the plurality of independent processing units.

2. The network system of claim 1, wherein the server is further configured to select a group of the plurality of independent processing units for processing of the processing task.

3. The network system of claim 2, wherein the server comprises a stored management guideline comprising one or several rules for the completion of the analysis of the processing task.

4. The network system of claim 3, wherein the management guideline specifies a number of reviews for one or several of the one or several groups of data in the processing task.

5. The network system of claim 1, wherein at least one of the independent processing units comprises a computer.

6. The network system of claim 1, wherein the server is further configured to:
    increment a count each time that the first one of the one or several groups of data is sent to one of the plurality of independent processing units; and
    compare the count to a threshold value to determine whether to send the first one of the one or several groups of data to an additional one of the plurality of independent processing units.

7. The network system of claim 6, wherein the server is further configured to select an additional one of the plurality of independent processing units if it is determined to send the first one of the one or several groups of data to an additional one of the plurality of independent processing units.

8. The network system of claim 7, wherein the server is further configured to receive an additional electric signal from the additional one of the plurality of independent processing units, wherein the first electric signal comprises an encoded
first score generated by the additional one of the plurality of independent processing units of the first one of the one or several groups of data.

9. The network system of claim 1, wherein the server is further configured to update the accuracy parameter with respect to the first one of the plurality of independent processing units, wherein the updating comprises comparing the combined score of the first one of the one or several groups of data to the first score and the accuracy parameter, and incrementing or decrementing the first component of the accuracy parameter based on the comparison.

10. The network system of claim 1, wherein updating the accuracy parameter further comprises retrieving an index function, wherein the index function generates an accuracy parameter update value for the first component of the accuracy parameter according to the difference between the first score and the combined score.

11. The network system of claim 10, wherein the first component of the accuracy parameter is incremented or decremented by the accuracy parameter update value.

12. The network system of claim 1, wherein the server is further configured to:
select one or several of the plurality of independent processing units for characterization of a potential bounding piece, wherein one of the several of the plurality of independent processing units are selected based on an accuracy parameter retrieved by the server, wherein the accuracy parameter identifies the degree to which one or several of the plurality of independent processing units have accurately characterized one or sever previous data groups; and
calculate a score of the groups of the processing task based on the bounding piece and the accuracy parameter.

13. The network system of claim 12, wherein the server is further configured to generate a ranked sequence of the several groups of data.

14. The network system of claim 13, wherein the bounding piece comprises one of the groups of the several groups of data.

15. The network system of claim 14, wherein the server is further configured to generate a ranked sequence of the several groups of data and an associated score.

16. The network system of claim 15, wherein the server is further configured to retrieve the bounding piece from memory.

17. The network system of claim 15, wherein the server is further configured to control the generation of the bounding piece.

18. The network system of claim 17, wherein the server is configured to select one of the several of the plurality of independent processing units for characterization of a potential bounding piece, wherein the one or several of the plurality of independent processing units are selected based on the accuracy parameter retrieved by the server, wherein the accuracy parameter identified the degree to which on or several of the plurality of independent processing units have accurately characterized one or several previous data groups.

19. The network system of claim 15, wherein the bounding piece comprises a plurality of bounding pieces, wherein some of the plurality of bounding pieces comprise different scores.

* * * * *